United States Patent
Takahashi et al.

(10) Patent No.: US 11,337,251 B2
(45) Date of Patent: May 17, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (CN)

(72) Inventors: Hiroki Takahashi, Sakai (JP); Shohei Yamada, Sakai (JP); Hidekazu Tsuboi, Sakai (JP); Tatsushi Aiba, Sakai (JP); Kazunari Yokomakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/320,470

(22) PCT Filed: Jul. 21, 2017

(86) PCT No.: PCT/JP2017/026465
§ 371 (c)(1),
(2) Date: Jan. 24, 2019

(87) PCT Pub. No.: WO2018/021183
PCT Pub. Date: Feb. 1, 2018

(65) Prior Publication Data
US 2020/0205202 A1    Jun. 25, 2020

(30) Foreign Application Priority Data
Jul. 26, 2016   (JP) .............................. JP2016-146042

(51) Int. Cl.
*H04W 74/08*   (2009.01)
*H04B 7/06*    (2006.01)
(Continued)

(52) U.S. Cl.
CPC ...... *H04W 74/0833* (2013.01); *H04B 7/0456* (2013.01); *H04B 7/0617* (2013.01);
(Continued)

(58) Field of Classification Search
CPC ............ H04W 74/008; H04W 74/004; H04W 74/006; H04W 74/0833
See application file for complete search history.

(56) References Cited

U.S. PATENT DOCUMENTS

| 2010/0202288 A1* | 8/2010 | Park ................. H04W 74/0833 |
| | | 370/230 |
| 2011/0205908 A1* | 8/2011 | Yi ...................... H04W 74/002 |
| | | 370/242 |

(Continued)

FOREIGN PATENT DOCUMENTS

| EP | 3410810 A1 | 12/2018 |
| JP | 2015-216503 A | 12/2015 |

(Continued)

OTHER PUBLICATIONS

NTT Docomo, "Revision of SI: Study on New Radio Access Technology", RP-161214,3GPP TSG RAN Meeting #72, Busan, Korea, Jun. 13-16, 2016.

(Continued)

*Primary Examiner* — Ashley Shivers
(74) *Attorney, Agent, or Firm* — ScienBiziP, P.C.

(57) ABSTRACT

There is provided a terminal apparatus to transmit a first random access preamble using a first precoding, monitor a random access response corresponding to the first random access preamble, increment a value of a counter in a case that a reception of the random access response is not successful, and transmit a second random access preamble
(Continued)

using a second precoding, if the value of the counter does not reach a predetermined value in a case that the value of the counter is incremented.

4 Claims, 17 Drawing Sheets

(51) Int. Cl.
*H04W 74/00* (2009.01)
*H04B 7/0456* (2017.01)
*H04W 16/28* (2009.01)
*H04W 52/50* (2009.01)

(52) U.S. Cl.
CPC .......... *H04B 7/0695* (2013.01); *H04W 16/28* (2013.01); *H04W 52/50* (2013.01); *H04W 74/002* (2013.01)

(56) References Cited

U.S. PATENT DOCUMENTS

| | | | |
|---|---|---|---|
| 2012/0002606 A1* | 1/2012 | Vujcic | H04W 36/385 370/328 |
| 2013/0028239 A1* | 1/2013 | Dinan | H04L 5/0085 370/336 |
| 2013/0035084 A1 | 2/2013 | Song et al. | |
| 2014/0256365 A1* | 9/2014 | Schmidt | H04W 4/12 455/466 |
| 2014/0376466 A1 | 12/2014 | Jeong et al. | |
| 2016/0029358 A1 | 1/2016 | Hou et al. | |
| 2016/0302233 A1* | 10/2016 | Gopala Krishnan | H04W 74/0833 |
| 2017/0006641 A1* | 1/2017 | Dinan | H04W 74/0833 |
| 2017/0273056 A1* | 9/2017 | Papasakellariou | H04W 52/143 |
| 2017/0332407 A1 | 11/2017 | Islam et al. | |
| 2018/0359790 A1* | 12/2018 | Ingale | H04W 28/16 |
| 2020/0029352 A1 | 1/2020 | Aiba et al. | |

FOREIGN PATENT DOCUMENTS

| | | |
|---|---|---|
| JP | 2016-510197 A1 | 4/2016 |
| JP | 2019-522395 A | 8/2019 |
| KR | 10-2014-0043498 A | 4/2014 |
| WO | 2014/139174 A1 | 9/2014 |
| WO | 2016/086144 A1 | 6/2016 |
| WO | 2017/200735 A1 | 11/2017 |

OTHER PUBLICATIONS

WF on Supported NR Operations, R1-165559, 3GPP TSG RAN WG1 #85, Nanjing, China, May 23-27, 2016.
CMCC, "On Gradual UE-Specific (GUS) beamformed control channel", R1-164891, 3GPP TSG-RAN WG1 Meeting #85 Nanjing, China, May 23-27, 2016, pp. 1-3.
Interdigitalcommunications, "Beam-based design framework for New Radio", R1-164874, 3GPP TSG-RAN WG1 Meeting #85 Nanjing, China, May 23-27, 2016, pp. 1-4.
Office Action dated Nov. 26, 2019 issued in JP Patent Application No. JP2018-529847 Machine translation obtained by Global Dossier on Feb. 4, 2020 (This reference includes English machine translation, but no representation is made as to its accuracy. If the Examiner would like additional information regarding this reference or if anything is unclear, the Examiner is invited to contact the undersigned for assistance.).
Ericsson, "Running MAC CR for LAA", R2-164522, 3GPP TSG-RAN WG2 Meeting #94, Nanjing, P.R. China, May 23-27, 2016, pp. 1-80.
Samsung, "Random Access Procedure in NR", R2-163372, 3GPP TSG-RAN WG2 Meeting #94, Nanjing, China, May 23-27, 2016, pp. 1-7.

* cited by examiner

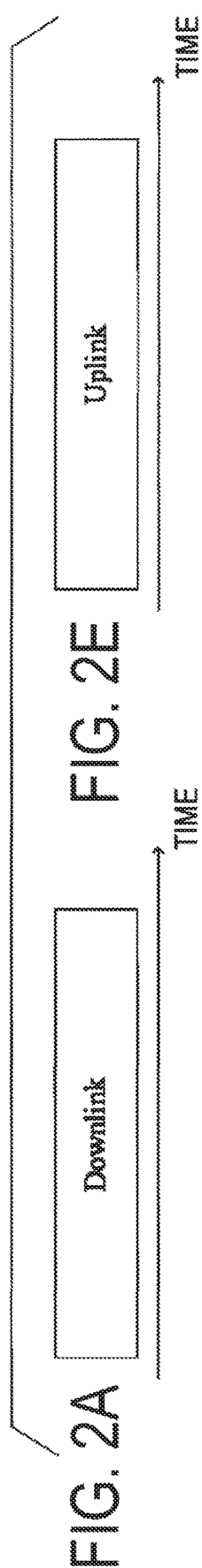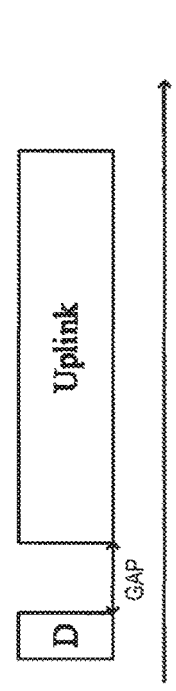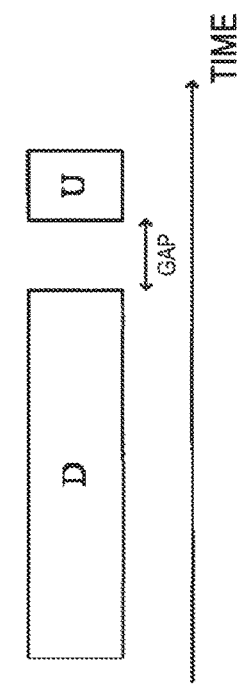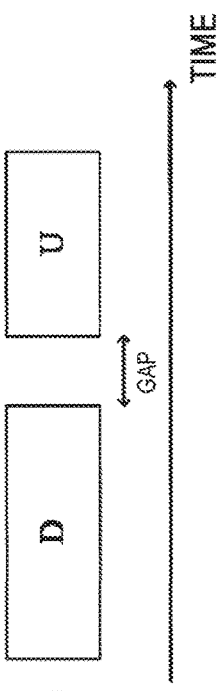

| BEAM USED BY DOWNLINK SIGNAL FOR RECEIVING RANDOM ACCESS CONFIGURATION INFORMATION | INDEX OF AVAILABLE UPLINK PRECODING |
|---|---|
| b1 | $I_{p1}, I_{p2}$ |
| b2 | $I_{p2}, I_{p3}$ |
| b3 | $I_{p3}, I_{p4}$ |

FIG. 7

| PRACH CONFIGURATION INDEX | AVAILABLE SUBFRAME NUMBER |
|---|---|
| 0 | $i_1$ |
| 1 | $i_2$ |
| 2 | $i_3$ |
| 3 | $i_4$ |

FIG. 8

| INDEX OF UPLINK PRECODING | PRACH CONFIGURATION INDEX |
|---|---|
| $I_{p1}$ | 3 |
| $I_{p2}$ | 1 |
| $I_{p3}$ | 2 |
| $I_{p4}$ | 0 |

FIG. 9

| PRACH CONFIGURATION INDEX | INDEX OF UPLINK PRECODING | AVAILABLE SUBFRAME NUMBER |
|---|---|---|
| 0 | $I_{p1}$ | 1 |
|   | $I_{p2}$ | 2 |
| 1 | $I_{p1}$ | 3 |
|   | $I_{p2}$ | 4 |

FIG. 10

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on Japanese Patent Application No. 2016-146042 filed on Jul. 26, 2016, the contents of which are incorporated herein by reference.

BACKGROUND ART

At present, Long Term Evolution-Advanced Pro (LTE-A Pro), which is an extended standard of Long Term Evolution (LTE), and New Radio (NR) technology are being considered and standardization is in progress in the Third Generation Partnership Project (3GPP) as a radio access scheme and a radio network technology in anticipation of the fifth generation cellular system (NPL 1).

In the fifth generation cellular system, three services comprising an enhanced Mobile BroadBand (eMBB) for realizing high-speed and large-capacity transmission, an Ultra-Reliable and Low Latency Communication (URLLC) for realizing low-delay and high-reliability communication, and a massive Machine Type Communication (mMTC) to which a large number of machine-type devices such as Internet to Things (IoT) are connected, are required as an assumed scenario of service.

With regards to NR, in order to widen the coverage mainly in the high frequency cell with high attenuation, it is being studied to cover the entire cell by setting a plurality of regions in the cell using beam forming and transmitting the signals sequentially for each region (NPL 2).

CITATION LIST

Non Patent Literature

NPL 1: RP-161214, NTT DOCOMO, "Revision of SI: Study on New Radio Access Technology", June, 2016
NPL 2: 3GPP R1-165559 http://www.3gpp.org/ftp/tsg_ran/WG1_RL1/TSGR1_85/Docs/R1-165559.zip

SUMMARY OF INVENTION

Technical Problem

An aspect of the present invention provides a terminal apparatus capable of efficiently communicating with a base station apparatus, a base station apparatus communicating with the terminal apparatus, a communication method used for the terminal apparatus, a communication method used for the base station apparatus. For example, the communication methods used for the terminal apparatus and the base station apparatus may include an uplink transmission method, a modulation method, and/or a coding method for reducing interference between cells and/or between terminal apparatuses.

Solution to Problem (1) According to some aspects of the present invention, the following measures are provided. Namely, the first aspect of the present invention is a terminal apparatus comprising: a selection unit to select a first precoding from a plurality of available precoding and select a first random access preamble from a plurality of available random access preambles; a transmission unit to transmit the first random access preamble to a base station apparatus using the first precoding; a reception unit to monitor a random access response corresponding to the first random access preamble; and a counter unit to increment a value of a counter in a case that a reception of the random access response is not successful, wherein the selection unit selects a second precoding from the plurality of available precoding and selects a second random access preamble from the plurality of available random access preambles, if the value of the counter does not reach a predetermined value in a case that the value of the counter is incremented, wherein the transmission unit transmits the second random access preamble using the second precoding to the base station apparatus.

(2) The second aspect of the present invention is a terminal apparatus comprising: a transmission unit to transmit a plurality of random access preambles, to which a plurality of precoding different from each other are applied to a base station apparatus; a reception unit to monitor random access responses corresponding to the plurality of transmitted random access preambles; and a counter unit to increment a value of a counter in a case that a reception of the random access response is not successful, wherein the transmission unit transmits again the plurality of random access preambles, to which the plurality of precoding are applied, to a base station apparatus, if the value of the counter does not reach a predetermined value in a case that the value of the counter is incremented by 1.

(3) The third aspect of the present invention is a base station apparatus, comprising: a transmission unit to transmit information for identifying one or a plurality of precoding available to a terminal apparatus; and a reception unit to receive a random access preamble transmitted from the terminal apparatus using one precoding of the one or the plurality of precoding, wherein the transmission unit transmits a random access response corresponding to the received random access preamble and the one precoding.

(4) The fourth aspect of the present invention is a communication method used in a terminal apparatus, the method comprising: selecting a first precoding from a plurality of available precoding; selecting a first random access preamble from a plurality of available random access preambles; transmitting the first random access preamble to a base station apparatus using the first precoding; monitoring a random access response corresponding to the first random access preamble; incrementing a value of a counter in a case that a reception of the random access response is not successful; selecting a second precoding from the plurality of available precoding and selecting a second random access preamble from the plurality of available random access preambles, if the value of the counter does not reach a predetermined value in a case that the value of the counter is incremented; and transmitting the second random access preamble using the second precoding to the base station apparatus.

(5) The fifth aspect of the present invention is a communication method used in a terminal apparatus, the method comprising: transmitting a plurality of random access preambles, to which a plurality of precoding different from each other are applied, to a base station apparatus; monitoring random access responses corresponding to the plurality of transmitted random access preambles; incrementing a value of a counter in a case that a reception of the random access response is not successful; and transmitting again the plurality of random access preambles, to which the plurality of precoding are applied, to a base station apparatus, if the value of the counter does not reach a predetermined value in a case that the value of the counter is incremented by 1.

(6) The sixth aspect of the present invention is a communication method used in a base station apparatus, the method comprising: transmitting information for identifying one or a plurality of precoding available to a terminal apparatus; receiving a random access preamble transmitted from the terminal apparatus using one precoding of the one or the plurality of precoding; and transmitting a random access response corresponding to the received random access preamble and the one precoding.

Advantageous Effects of Invention

According to one aspect of the present invention, a terminal apparatus and a base station apparatus can efficiently communicate with each other.

BRIEF DESCRIPTION OF DRAWINGS

FIGS. 2A to 2E are diagrams, each illustrating an example of a subframe (subframe type) according to an embodiment of the present invention.

FIG. 7 is a diagram illustrating an example of a relationship between a beam used for a downlink signal for receiving random access configuration information according to an embodiment of the present invention, and an available uplink precoding index indicated in the random access configuration information.

FIG. 8 is a diagram illustrating an example of a table in a case that the transmittable subframe number is indicated as a set of available PRACH resources in the random access configuration information according to an embodiment of the present invention.

FIG. 9 is a diagram illustrating an example of a set of PRACH resources indicated by the random access configuration information according to an embodiment of the present invention.

FIG. 10 is a diagram illustrating an example of a relationship between a PRACH configuration index, an index of uplink precoding used for transmission of a random access preamble, and indexes of available subframe numbers according to an embodiment of the present invention.

DESCRIPTION OF EMBODIMENTS

Embodiments of the present invention will be described below.

LTE (and LTE-A Pro) and NR may be defined as different Radio Access Technologies (RATs). NR may be defined as a technology included in LTE. The present embodiment may be applied to NR, LTE and other RATS. In the following description, explanation will be made using tennis related to LTE, but it may also be applied to other technologies using other terms.

Figure 1:
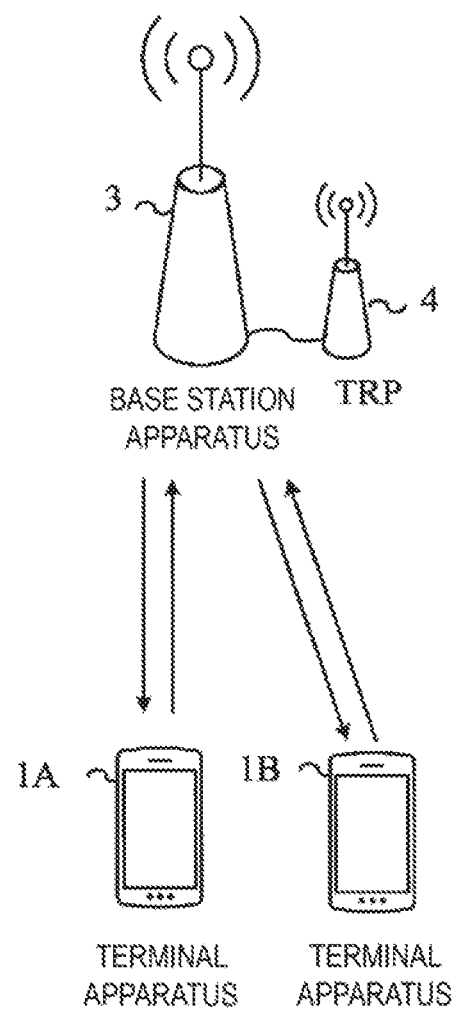
FIG. 1 is a conceptual diagram of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, a base station apparatus 3. The terminal apparatus 1A and the terminal apparatus 1B are also referred to as a terminal apparatus 1. The terminal apparatus 1 may also be referred to as a mobile station apparatus, a User Equipment (UE), a communication terminal, a mobile apparatus, a terminal, a Mobile Station (MS), or the like. The base station apparatus 3 may also be referred to as a radio base station apparatus, a base station, a radio base station, a fixed station, a Node B (NB), an evolved Node B (eNB), an NR Node B (NR NB), a next generation Node B (gNB), an access point, a Base Transceiver Station (BTS), a Base Station (BS), or the like. The base station apparatus 3 may include a core network apparatus. Also, the base station apparatus 3 may include one or more Transmission Reception Points (TRP) 4. The base station apparatus 3 may serve the terminal apparatus 1 in a communication range (communication area) controlled by the base station apparatus 3, as one or more cells. Further, the base station apparatus 3 may serve the terminal apparatus 1 in a communication range (communication area) controlled by one or more transmission/reception points 4, as one or more cells. Alternatively, the terminal apparatus 1 may be served in each partial area with one cell being divided into a plurality of partial areas (beamed areas). Here, the partial region may be identified on the basis of the preceding index.

The communication area covered by the base station apparatus 3 may be different in size and shape for each frequency. Moreover, the covered area may be different for each frequency. Further, a radio network, in which cells having different types of base station apparatuses 3 and different cell radius sizes are mixed at the same frequency or different frequencies to constitute a single communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from one terminal apparatus 1 to the other terminal apparatus 1 is referred to as a side link.

In FIG. 1, in radio communication between the terminal apparatus 1 and the base station apparatus 3 and/or radio communication between one terminal apparatus 1 and the other terminal apparatus 1, an Orthogonal Frequency Division Multiplexing (OFDM) comprising a Cyclic Prefix (CP), a Single-Carrier Frequency Division Multiplexing (SC-FDM), a Discrete Fourier Transform Spread OFDM (DFT-S-OFDM), a MultiCarrier Code Division Multiplexing (MC-CDM) may be used.

Also, in FIG. 1, in radio communication between the terminal apparatus 1 and the base station apparatus 3 and/or radio communication between one terminal apparatus 1 and the other terminal apparatus 1, Universal Filtered Multi-Carrier (UFMC), Filtered OFDM (F-OFDM), window-multiplied OFDM (Windowed OFDM), Filter-Bank Multi-Carrier (FBMC) may be used.

In the present embodiment, OFDM is used as a transmission scheme and the explanation will be made using OFDM symbols, but the case of using the above-described other transmission scheme is also included in one aspect of the present invention.

Further, in FIG. 1, in the radio communication between the terminal apparatus 1 and the base station apparatus 3 and/or the radio communication between one terminal apparatus 1 and the other terminal apparatus 1, the above-described transmission scheme without using CP or with zero padding instead of CP, may be used. Also, CP and zero padding may be attached to both forward and backward.

In FIG. 1, in a radio communication between the terminal apparatus 1 and the base station apparatus 3 and/or radio communication between one terminal apparatus 1 and the other terminal apparatus 1, an Orthogonal Frequency Division Multiplexing (OFDM) comprising a Cyclic Prefix (CP), a Single-Carrier Frequency Division Multiplexing (SC-FDM), a Discrete Fourier Transform Spread OFDM (DFT-S-OFDM), a MultiCarrier Code Division Multiplexing (MC-CDM) may be used.

According to the present embodiment, one or a plurality of serving cells are configured for the terminal apparatus 1. A plurality of configured serving cells include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. One or more secondary cells may be configured at a point of time when or after a Radio Resource Control (RRC) connection has been established.

Time Division Duplex (TDD) and/or Frequency Division Duplex (FDD) may be applied to a radio communication system according to the present embodiment. A time division duplex (TDD) scheme or a frequency division duplex (FDD) scheme may be applied to all the plurality of cells. Cells to which the TDD scheme is applied and cells to which the FDD scheme is applied may be aggregated.

A carrier corresponding to a serving cell in the downlink is referred to as a downlink component carrier (or downlink carrier). A carrier corresponding to a serving cell in the uplink is referred to as an uplink component carrier (or uplink carrier). A carrier corresponding to a serving cell in the sidelink is referred to as a sidelink component carrier (or sidelink carrier). The downlink component carrier, the uplink component carrier, and/or the side link component carrier are collectively referred to as a component carrier (or a carrier).

In the present embodiment, the processing performed by the terminal apparatus 1 and/or the base station apparatus 3 for uplink beam forming is referred to as uplink precoding or precoding. Further, in the present embodiment, the processing performed by the terminal apparatus 1 and/or the base station apparatus 3 for downlink beam forming is referred to as downlink precoding. Precoding may be referred to as beam.

Physical channels and physical signals according to the present embodiment will be described.

In FIG. 1, the following physical channels are used for radio communication between the terminal apparatus 1 and the base station apparatus 3. The physical channels are used for transmission of information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast important information block (Master Information Block (MIB), Essential Information Block (EIB)) including important system information (Essential Information) required by the terminal apparatus 1. Here, one or more important information blocks may be transmitted as an important information message. For example, the important information block may include information indicating part or all of a frame number (System Frame Number (SFN)) (for example, information related to a position in a superframe consisting of a plurality of frames). For example, a radio frame (10 ms) is composed of 10 subframes of 1 ms, and the radio frame is identified by the frame number. The frame number returns to 0 at 1024 (Wrap around). Further, in a case that different important information blocks are transmitted for each area in a cell, information capable of identifying an area (for example, identifier information of the transmission beam constituting the area) may be included. Here, the identifier information of the transmission beam may be indicated using an index of precoding. In addition, in a case that different important information blocks (important information message) are transmitted for each area in a cell, information capable of identifying a time position within a frame (for example, the subframe number including the important information block (important information message)) may be included. That is, information for determining each of the subframe numbers that each transmission of important information blocks (important information messages) using indexes of different precoding is performed, may be included. For example, the important information may include information necessary for the connection to a cell and mobility.

The PCCH is used for transmitting Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCI resource. The uplink control information may include Hybrid Automatic Repeat reQuest ACKnowledgment (HARQ-ACK). The HARQ-ACK may indicate HARQ-ACK for downlink data (Transport block, Medium Access Control Protocol Data Unit (MAC PDU), or Downlink-Shared Channel (DL-SCH)).

Also, the PCCH is used for transmitting Downlink Control Information (DCI) in a case of downlink radio communication (radio communication from the base station apparatus 3 to the terminal apparatus 1). Here, one or more DCIs (may be referred to as DCI formats) are defined for transmission of downlink control information. In other words, a field for the downlink control information is defined as a DCI and is mapped to information bits.

For example, as a DCI, a DCI including information indicating whether a signal included in the scheduled PSCH is downlink radio communication or uplink radio communication may be defined.

For example, as a DCI, a DCI including information indicating a down transmission period included in the scheduled PSCH may be defined.

For example, as a DCI, a DCI including information indicating an uplink transmission period included in the scheduled PSCH may be defined.

For example, as a DCI, a DCI including information indicating the timing for transmitting the HARQ-ACK with respect to the scheduled PSCH (for example, the number of symbols from the last symbol included in the PSCH to the HARQ-ACK transmission) may be defined.

For example, as a DCI, a DCI including information indicating a downlink transmission period, a gap, and an uplink transmission period included in the scheduled PSCH may be defined.

For example, as a DCI, a DCI used for scheduling one downlink radio communication PSCH (transmission of one downlink transport block) in one cell may be defined.

For example, as a DCI, a DCI used for scheduling one uplink radio communication PSCH (transmission of one uplink transport block) in one cell may be defined.

Here, the DCI includes information related to the scheduling of the PSCH in a case that the PSCH includes an uplink or a downlink. Here, the DCI for the downlink is also referred to as downlink grant or downlink assignment. Here, the DCI for the uplink is also referred to as uplink grant or uplink assignment.

The PSCH is used for transmission of uplink data (Uplink Shared CHannel (UL-SCH)) or downlink data (Downlink Shared CHannel (DL-SCH)) from Medium Access Control (MAC). Also, in a case of downlink, the PSCH is also used for transmitting such as System Information (SI) and Random Access Response (RAR). In a case of uplink, the PSCH may be used for transmitting HARQ-ACK and/or CSI along with uplink data. Further, the PSCH may be used for transmitting CSI only, or HARQ-ACK and CSI only. In other words, the PSCH may be used to transmit UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive Radio Resource Control (RRC) signaling (also referred to as RRC message or RRC information) in the RRC layer, respectively. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

The PSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be arranged for uplink and used for transmitting UE capability.

Whereas PCCH and PSCH use the same designation for downlink and uplink, different channels may be defined for downlink and uplink. For example, the PCCH for the downlink may be defined as Physical Downlink Control CHannel (PDCCH) and the PCCH for the uplink may be defined as Physical Uplink Control CHannel (PUCCH).

For example, the PSCH for the downlink may be defined as Physical Downlink Shared CHannel (PDSCH) and the PSCH for the uplink may be defined as Physical Uplink Shared CHannel (PUSCH).

The PRACH may be used to transmit a random access preamble (random access message 1). The PRACH may be used for an initial connection establishment procedure, a handover procedure, a connection re-establishment procedure, uplink transmission synchronization (timing adjustment), and indicating an uplink PSCH (UL-SCH) resource request.

In FIG. 1, the following downlink physical signals are used for downlink radio communication. Here, the downlink physical signals are not used to transmit the information output from the higher layers but is used by the physical layer.

Synchronization Signal (SS)

Reference Signal (RS)

The synchronization signal may be used for the terminal apparatus 1 to take synchronization in the frequency domain and the time domain in the downlink. The synchronization signal may include Primary Synchronization Signal (PSS) and/or Second Synchronization Signal (SSS). Also, the synchronization signal may be used by the terminal apparatus 1 for selecting precoding by the base station apparatus 3, or selecting precoding or beam in beamforming. That is, the synchronization signal may be used by the terminal apparatus to determine the precoding index or beam index applied to the downlink signal by the base station apparatus 3.

A downlink reference signal (hereinafter also simply referred to as a reference signal) is mainly used for the terminal apparatus 1 to perform propagation path compensation of a physical channel. That is, the downlink reference signal may include a demodulation reference signal. The downlink reference signal may also be used for the terminal apparatus 1 to calculate the downlink channel state information. That is, the downlink reference signal may include a channel state information reference signal. Further, the downlink reference signal may be used for fine synchronization such that numerology such as radio parameters and subcarrier intervals, and window synchronization of FFT can be performed.

The downlink physical channels and the downlink physical signals may be collectively referred to as a downlink signal. The uplink physical channels and the uplink physical signals may be collectively referred to as an uplink signal.

The subframe will be described below. In the present embodiment, it is referred to as a subframe, but it may also be referred to as a resource unit, a radio frame, a time section, a time interval, or the like.

FIGS. 2A to 2E illustrate examples of a subframe (subframe type). In the figures, D represents a downlink and U represents an uplink. As shown in the figure, in a certain time period (for example, the minimum time section that must be allocated to one Li in the system), one or more of downlink part gap uplink part may be included.

FIG. 2A illustrates an example in which a certain time period (for example, the minimum unit of time resources capable of being allocated to one 1UE) is used in whole for downlink transmission. In FIG. 2B, an uplink scheduling is performed in the first time resource, for example, via the PCCH, and an uplink signal is transmitted with a gap for the PCCH processing delay, a switching time from downlink to uplink, and the generation of a transmit signal. FIG. 2C is used for transmission of the downlink PCCH and/or the downlink PSCH in the first time resource, and is used for transmission of PSCH or PCCH with a gap for the processing delay, a switching time from downlink to uplink, and the generation of a transmit signal. Here, as an example, the uplink signal may be used for transmission of HARQ-ACK and/or CSI, that is UCI. FIG. 2D is used for transmission of the downlink PCCH and/or the downlink PSCH in the first time resource, and is used for transmission of uplink PSCH and/or PCCH with a gap for the processing delay, a switching time from downlink to uplink, and the generation of a transmit signal. Here, as an example, the uplink signal may be used for transmission of uplink data, that is, UL-SCH. FIG. 2E is an example that the whole time period is used for uplink transmission (uplink PSCH or PCCH).

The above-mentioned downlink part and uplink part may be configured by a plurality of OFDM symbols in a similar manner to LTE.

Here, the resource grid may be defined by a plurality of subcarriers and a plurality of OFDM symbols or SC-FDMA symbols. The number of subcarriers constituting one slot may depend on a cell bandwidth. The number of OFDM symbols constituting one downlink part and uplink part may be one or two or more. Here, each element within the resource grid is referred to as a resource element. The resource element may be identified by a subcarrier number and an OFDM symbol or SC-FDMA symbol number.

The Random Access Procedure of the present embodiment will be described.

The random access procedure is classified into two procedures, i.e. contention based and non-contention based.

The contention based random access procedure is performed in an initial access from a state not being connected (communicating) with the base station apparatus 3, and/or at the time of a scheduling request in a case that transmittable uplink data or transmittable side link data generates in the terminal apparatus 1 in spite of being connected to the base station apparatus 3.

The generation of transmittable uplink data in the terminal apparatus 1 may include that a buffer status report corresponding to the transmittable uplink data is triggered. The generation of transmittable uplink data in the terminal apparatus 1 may include that a scheduling request triggered on the basis of the generation of the transmittable uplink data is kept pending.

The generation of transmittable sidelink data in the terminal apparatus 1 may include that a buffer status report corresponding to the transmittable sidelink data is triggered. The generation of transmittable sidelink data in the terminal apparatus 1 may include that a scheduling request triggered on the basis of the generation of the transmittable sidelink data is kept pending.

The non-contention based random access procedure is a procedure used by the terminal apparatus 1 indicated from the base station apparatus 3, and is used to quickly establish uplink synchronization between the terminal apparatus 1 and the base station apparatus 3, in a case that the base station apparatus 3 and the terminal apparatus 1 are being connected, but the handover or the transmission timing of the mobile station apparatus is not valid.

The contention-based random access procedure in the present embodiment will be described.

The terminal apparatus 1 of the present embodiment receives the random access configuration information through a higher layer before initiating the random access procedure. The random access configuration information may include the following information.

one or more uplink precoding (beam) available for transmitting a random access preamble (for example, a set of available uplink precoding)

available PRACH resource (for example, a set of available PRACH resource)

one or more available random access preambles (for example, a set of available random access preambles)

the maximum number of times for transmitting the preamble in each uplink precoding transmit power of the terminal apparatus 1 in the serving cell performing the random access procedure window size of random access response and Contention Resolution timer (mac-Contention Resolution timer)

power ramping step maximum number of transmission times for transmitting preamble Preamble initial transmit power Power offset based on preamble format Note that one or more of the uplink precoding available for transmitting the random access preamble may be indicated by an index corresponding to each precoding (precoding index or uplink precoding index). Note that, in one or more available uplink precoding, the index of each uplink precoding may be indicated by a bit map or the like, or the range of available precoding index may also be indicated. Note that, even in a case that the other information is used without using the index to identify the uplink precoding available for transmitting the random access preamble, a similar processing can be performed. Having the ability to set one or more uplink precoding (beam) available for transmitting a random access preamble, it is possible not only to make one-to-one correspondence between downlink precoding and uplink precoding, but also to make one-to-many correspondence. Thereby, the matching of the directions of the downlink and uplink beams becomes flexible.

Figure 3:
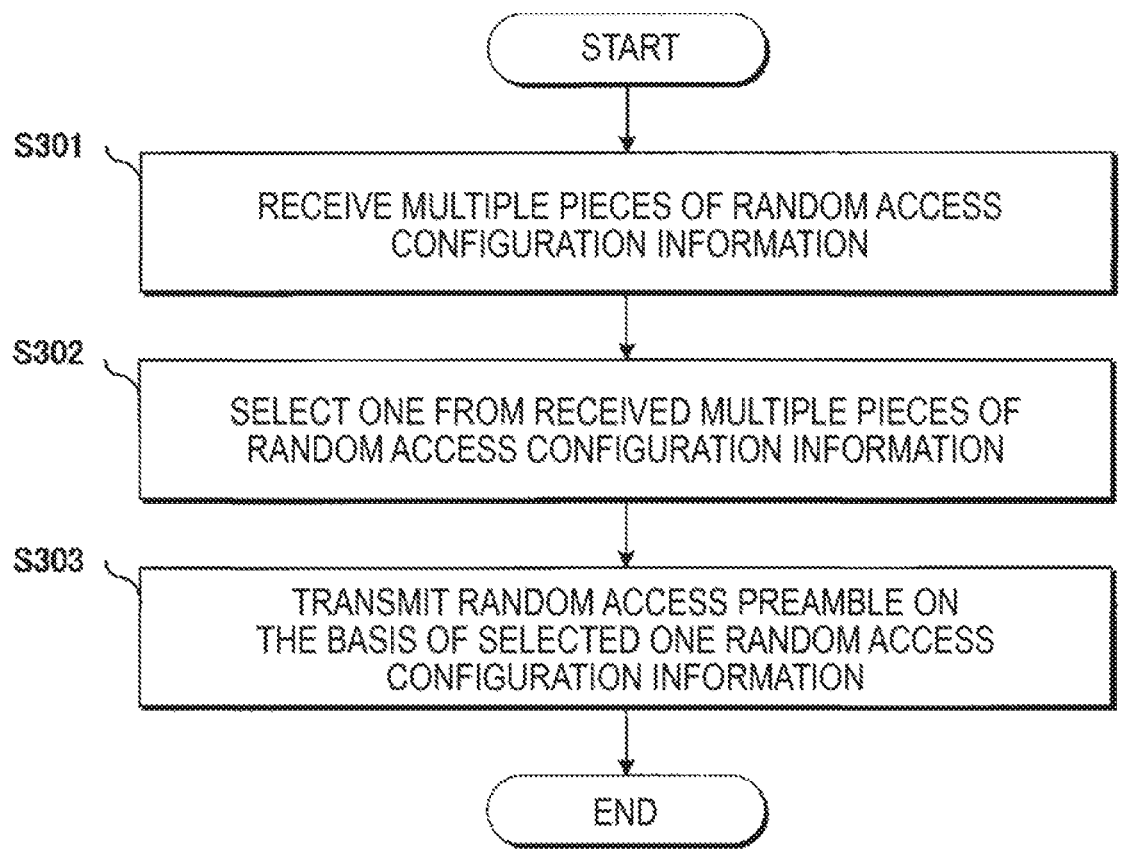
FIG. 3 is a flowchart illustrating an example of the operation of the terminal apparatus 1 according to an embodiment of the present invention.
Figure 4:
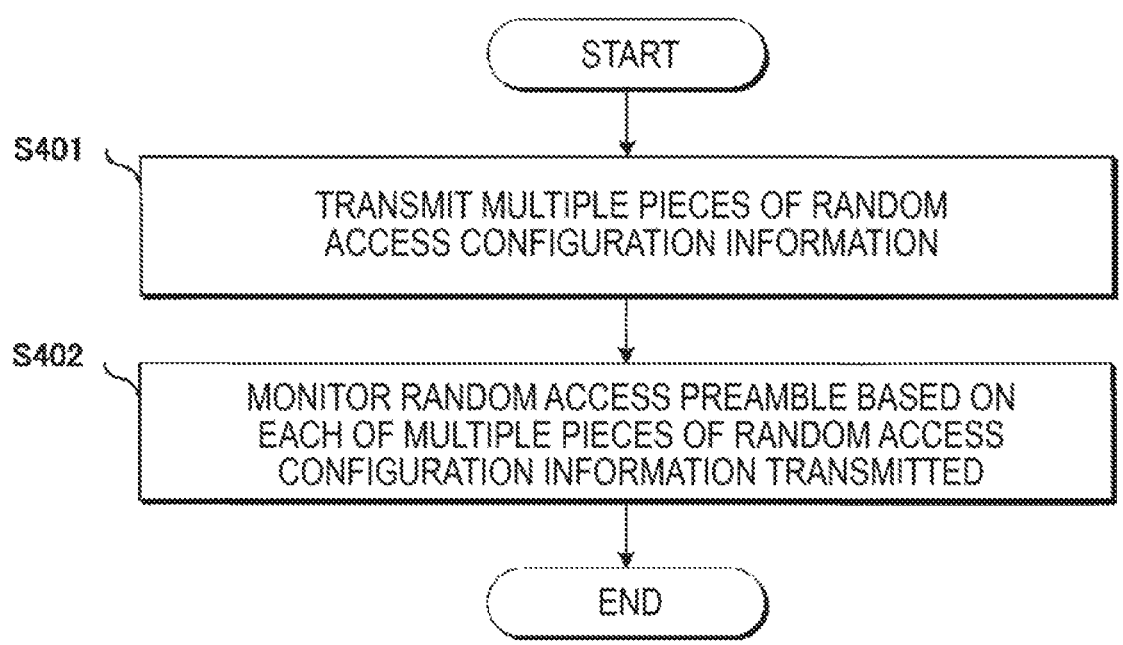
FIG. 4 is a flowchart illustrating an example of the operation of the base station apparatus 3 according to an embodiment of the present invention.

Note that the terminal apparatus 1 may receive one or more pieces of random access configuration information, and select one from the one or more pieces of random access configuration information to perform a random access procedure. FIG. 3 is a flowchart illustrating an example of the operation of the terminal apparatus 1 according to the present embodiment. The terminal apparatus 1 receives multiple pieces of random access configuration information (S301), and selects random access configuration information that is used for random access configuration to be used in the random access procedure from multiple pieces of received random access configuration information (S302). The terminal apparatus 1 transmits a random access preamble on the basis of the selected random access configuration information (S303). FIG. 4 is a flowchart illustrating an example of the operation of the base station apparatus 3 according to the present embodiment. The base station apparatus 3 transmits multiple pieces of random access configuration information (S401), and monitors a random access preamble to be transmitted on the basis of each of multiple pieces of transmitted random access configuration information (S402).

Note that the terminal apparatus 1 may use one or more uplink preceding as one or more uplink precoding available in the random access procedure, in a case that information indicating the one or more uplink precoding available for transmitting a random access preamble (it may be the index of one or more uplink precoding available for transmitting a random access preamble) is indicated in the selected random access configuration information. Note that one random access configuration information includes multiple pieces of information indicating one or more available uplink precoding, from which one information may be selected as one or more uplink precoding available in the random access procedure.

Note that the terminal apparatus 1 may receive multiple pieces of random access configuration information in different cells. For example, the terminal apparatus 1 can perform a random access procedure by selecting one random access configuration information from random access configuration information received by a first cell configured by the base station apparatus 3 and random access configuration information received by a second cell configured by the same or a different base station apparatus 3.

Note that one or more pieces of random access configuration information may be received from a base station apparatus 3 different from a base station apparatus 3, to which the terminal apparatus 1 transmits a random access preamble. For example, on the basis of at least one of the random access configuration information received from the first base station apparatus 3 forming the first cell, the terminal apparatus 1 may transmits the random access preamble to the second base station apparatus 3 forming the second cell.

Note that the terminal apparatus 1 may receive one or more pieces of random access configuration information with a downlink carrier different from a downlink carrier corresponding to an uplink carrier that transmits a random access preamble. Note that the terminal apparatus 1 may receive random access configuration information with a serving cell different from a serving cell that transmits a random access preamble. Thereby, for example, even in a case that a beam sweeping is applied to a downlink carrier corresponding to an uplink carrier that transmits a random access preamble and an uplink carrier, the terminal apparatus 1 can obtain random access configuration information to be applied to each beam direction in advance, which allows the terminal apparatus 1 to select one random access configuration information corresponding to the optimal beam. Therefore, as one example, on the basis of the measurement in the downlink carrier corresponding to the uplink carrier that transmits the random access preamble, the terminal apparatus 1 may select one random access configuration information from one or more pieces of random access configuration information.

Note that one or more available PRACH resources may be set independently for each available uplink precoding. Note that one or more available random access preambles may be set independently for each available uplink precoding. For example, a random access preamble group may be set for each uplink precoding, and an index of available random access preamble may be set for each random access preamble group. Note that the maximum number of transmission times of preambles in each uplink precoding may be set to a value common to all the available uplink precoding.

Figure 5:
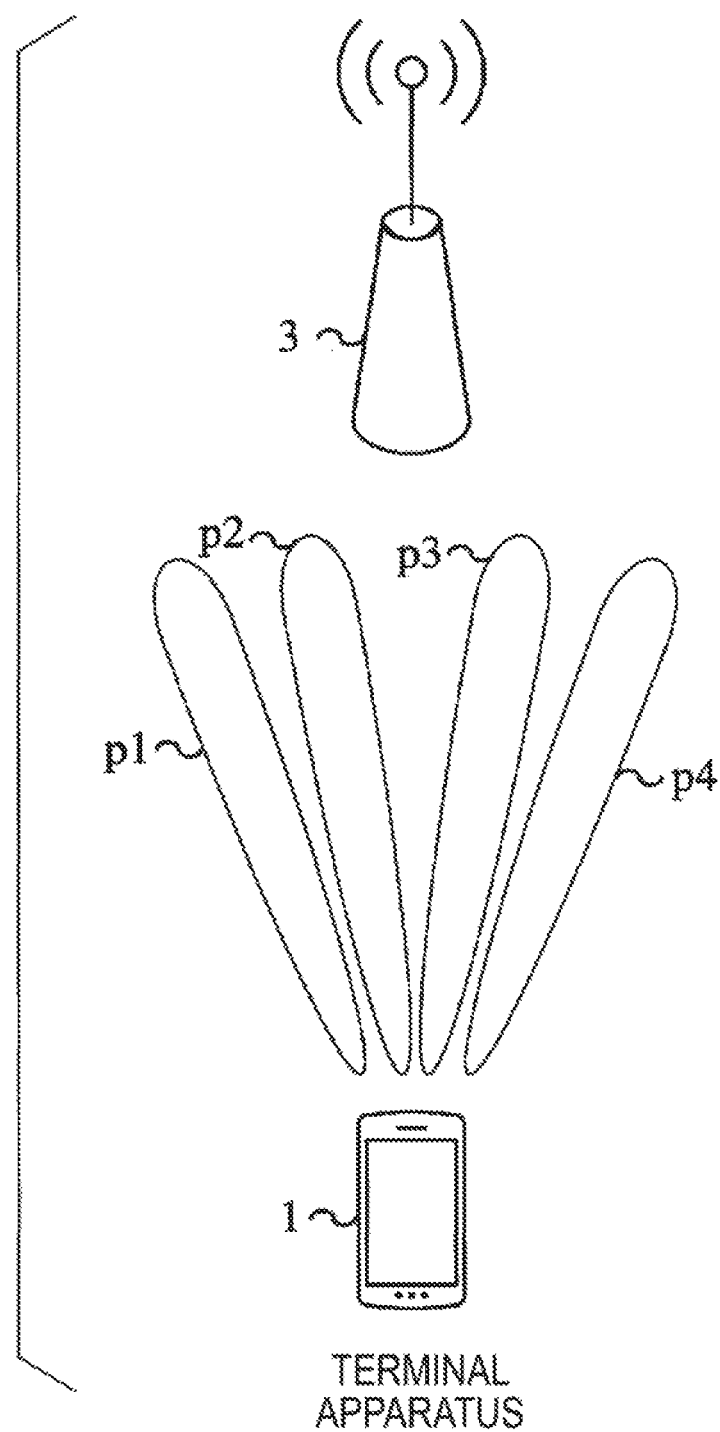
FIG. 5 is a conceptual diagram illustrating an example of uplink precoding available to the terminal apparatus 1 according to an embodiment of the present invention for transmitting a random access preamble to the base station apparatus 3.

FIG. 5 is a conceptual diagram illustrating an example of uplink precoding available to the terminal apparatus 1 for transmitting a random access preamble to the base station apparatus 3. The terminal apparatus 1 transmits a random access preamble by using any of a beam p1 using an uplink precoding with a precoding index of $I_{p1}$, a beam p2 using an uplink precoding with a precoding index of $I_{p2}$, a beam p3 using an uplink precoding with a precoding index of $I_{p3}$, and a beam p4 using an uplink precoding with a precoding index of $I_{p4}$.

Note that, in a case that an available uplink precoding is set according to random access configuration information, the terminal apparatus 1 transmits a random access preamble using one of the configured uplink precoding. For example, in a case that the indexes of available uplink precoding indicated by the received random access configuration information are $I_{p1}$ and $I_{p2}$, the terminal apparatus 1 transmits a random access preamble using the uplink precoding corresponding to either of the indexes $I_{p1}$ and $I_{p2}$.

Note that the terminal apparatus 1 may receive multiple pieces of random access configuration information with independent configuration from the base station apparatus 3. For example, the terminal apparatus 1 may receive random access configuration information independent for each downlink precoding to be applied to a downlink signal for receiving the random access configuration information.

Figure 6:
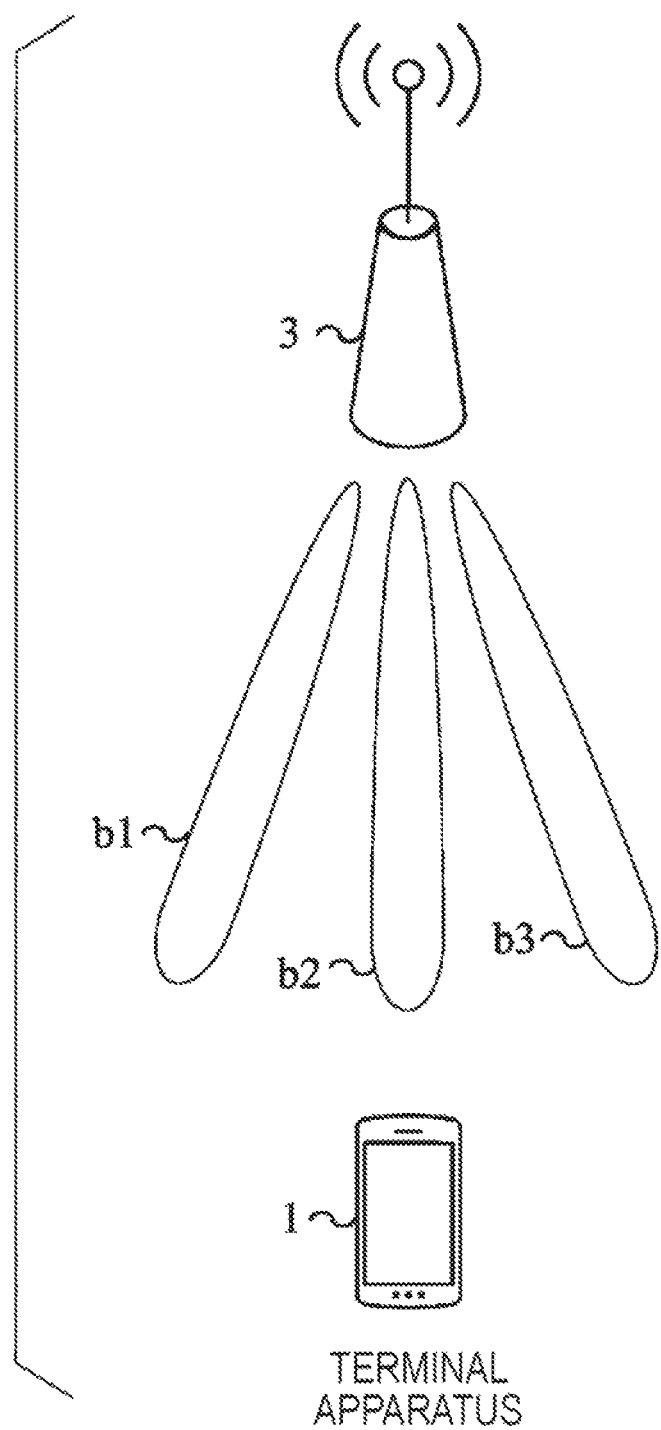
FIG. 6 is a diagram illustrating the case where the terminal apparatus 1 according to an embodiment of the present invention receives a downlink signal using a beam to which any one of a plurality of different downlink precoding is applied by the base station apparatus 3.

FIG. 6 is a diagram illustrating in a case that the terminal apparatus 1 receives a downlink signal using a beam to which any one of a plurality of different downlink precoding is applied by the base station apparatus 3. The base station apparatus 3 transmits a downlink signal to the terminal apparatus 1 by using a beam b1 using downlink precoding with a precoding index of $I_{b1}$, a beam b2 using downlink precoding with a precoding index of $I_{b2}$, and/or a beam b3 using downlink precoding with precoding index of $I_{b3}$. Note that a plurality of downlink signals using the beams b1, b2 and/or b3 may be transmitted in an overlapping time frame or may be transmitted at different time frames.

FIG. 7 is a diagram illustrating an example of a relationship between a beam used for a downlink signal for receiving random access configuration information and an available uplink precoding index indicated in the random access configuration information. The random access configuration information received by the beam b1 indicates that the indexes of the uplink precoding available for transmission of the random access preamble are $I_{p1}$ and $I_{p2}$. The random access configuration information received by the beam b2 indicates that the indexes of the uplink precoding available for transmission of the random access preamble are $I_{p2}$ and $I_{p3}$. The random access configuration information received by the beam b3 indicates that the indexes of the uplink precoding available for transmission of the random access preamble are $I_{p3}$ and $I_{p4}$. The terminal apparatus 1 transmits a random access preamble using any of the available uplink precoding indicated in the received random access configuration information.

Note that, in a case of receiving multiple pieces of random access configuration information, the terminal apparatus 1 may transmit a random access preamble on the basis of multiple pieces of random access configuration information.

For example, the terminal apparatus 1 receives the random access configuration information by the beam b1 and the beam b2 in FIG. 6, and the terminal apparatus 1 may set the available uplink precoding indexes as $I_{p1}$, $I_{p2}$, and $I_{p3}$ in a case that the available uplink precoding indexes are indicated respectively for the beams as shown in the example of FIG. 7.

As one or more available PRACH resources included in the random access configuration information, a subframe number, a system frame number, a symbol number that can transmit a random access preamble in each PRACH resource, an available uplink precoding, and/or a preamble format may be configured.

FIG. 8 is an example of a table in a case that the transmittable subframe number is indicated as a set of available PRACH resources in the random access configuration information. In FIG. 8, the PRACH configuration indexes may include 0, 1, 2, 3, each of which indicates that subframe numbers i1, i2, i3, or i4 is available, respectively. Note that the available subframe numbers in each PRACH configuration index may be one or more of the subframe numbers in the system frame. Note that for each of the PRACH configuration indexes, available system frame numbers may be indicated. Note that available system frame numbers may be indicated by whether they are odd or even. Note that for each PRACH configuration index, available preambles formats may be indicated. Note that for each PRACH configuration index, available symbol numbers may be indicated.

FIG. 9 illustrates the relationship between the index of the uplink precoding used for transmission of the random access preamble and the PRACH configuration index, as an example of the set of PRACH resources indicated by the random access configuration information according to the present embodiment. The terminal apparatus 1 receives random access configuration information in which a PRACH configuration index is individually set for each index of the available uplink precoding. In FIG. 9, an independent PRACH configuration index is set for each index of the uplink precoding, and a random access preamble may be transmitted using a subframe that has been independently set for each index of the uplink precoding on the basis of FIG. 8.

Note that the independent PRACH configuration is set for each uplink pre coding to be used for transmission of a random access preamble is illustrated in FIG. 9, but a set of the independent PRACH resource may be set for each uplink precoding by a different means. For example, configuration corresponding to a plurality of uplink precoding may be individually defined for one PRACH configuration. For example, in a case that one PRACH configuration is indicated for random access configuration information, the subframe for transmitting a random access preamble may be different depending on uplink precoding to be used by the terminal apparatus 1 for transmitting the random access preamble. FIG. 10 is a diagram illustrating an example of a relationship between a PRACH configuration index, an index of uplink precoding to be used for transmission of a random access preamble, and an index of available subframe number. In FIG. 10, in a case that the PRACH configuration index is 0, the subframe number available for transmission of the random access preamble using the uplink precoding with the index of $I_{p1}$ is $i_1$, and the subframe number available for transmission of the random access preamble using the uplink precoding with the index of $I_{p2}$ is $i_2$. Also, in a case that the PRACH configuration index is 1, the subframe number available for transmission of the random access preamble using the uplink precoding with the index of $I_{p1}$ is $i_3$, and the subframe number available for transmission of the random access preamble using the uplink precoding with the index of $I_{p2}$ is $i_4$.

Figure 11:
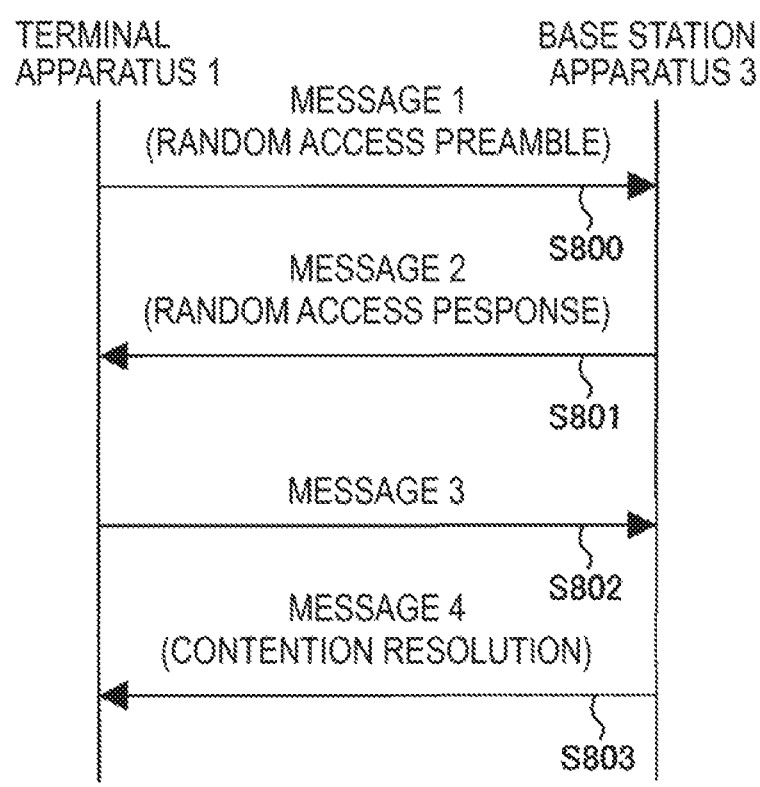
FIG. 11 is a diagram illustrating a contention-based random access procedure according to an embodiment of the present invention.

As shown in FIG. 11, the contention-based random access procedure is realized by transmission and/or reception of four kinds of messages between the terminal apparatus 1 and the base station apparatus 3.

<Message 1 (S800)>

The terminal apparatus 1 in which the transmittable uplink data or the transmittable side link data has generated transmits a preamble for random access (referred to as a random access preamble) to the base station apparatus 3 through Physical Random Access Channel (PRACH). This transmitted random access preamble is referred to as message 1 or Msg 1. The random access preamble is configured to notify information to the base station apparatus 3 by a plurality of sequences. For example, in a case that 64 types of sequences are available, 6-bit information can be provided to the base station apparatus 3. This information is indicated as a Random Access Preamble Identifier. The preamble sequence is selected from the preamble sequence set using the preamble index. One selected random access preamble is transmitted with the transmit power $P_{PRACH}$ in the resource of the designated PRACH.

<Message 2 (S801)>

The base station apparatus 3 which received the random access preamble generates a random access response including an uplink grant for instructing the terminal apparatus 1 to transmit, and transmits the generated random access response to the terminal apparatus 1 with the downlink PSCH. The random access response is referred to as message 2 or Msg 2. Further, the base station apparatus 3 calculates a deviation of the transmission timing between the terminal apparatus 1 and the base station apparatus 3 from the received random access preamble, and includes the transmission timing adjustment information (Timing Advance Command) for adjusting the deviation in the message 2. Also, the base station apparatus 3 includes the random access preamble identifier corresponding to the received random access preamble in the message 2. In addition, the base station apparatus 3 transmits with the downlink PCCH Random Access-Radio Network Temporary Identity (RA-RNTI) for indicating a random access response addressed to the terminal apparatus 1 that has transmitted the random access preamble. The RA-RNTI is determined according to the location information of the physical random access channel that transmitted the random access preamble and/or the precoding index, which has been used for transmitting the random access preamble. Here, the message 2 (downlink PSCH) may include the precoding index that has been used for transmission of the random access preamble. Also, information for determining precoding to be used for transmission of the message 3 may be transmitted using downlink PCCH and/or the message 2 (downlink PSCH). Here, information for determining the precoding to be used for transmission of the message 3 may include information indicating the difference (adjustment, correction) from the preceding index that has been used for transmission of the random access preamble.

<Message 3 (S802)>

The terminal apparatus 1 that transmitted the random access preamble performs monitoring of the downlink PCCH for the access response identified by RA-RNTI in a plurality of subframe periods (referred to as RA response windows) after transmitting the random access preamble. In a case of detecting the corresponding RA-RNTI, the terminal apparatus 1 that transmitted the random access preamble decodes the random access response allocated in the downlink PSCH. The terminal apparatus 1 that has successfully decoded the random access response checks whether or not the random access response includes a random access preamble identifier corresponding to the transmitted random access preamble. In a case that the random access preamble identifier is included, the synchronization deviation is corrected by using the transmission timing adjustment information indicated in the random access response. Further, the terminal apparatus 1 transmits data stored in the buffer to the base station apparatus 3 using the uplink grant included in the received random access response. At this time, data transmitted using the uplink grant is referred to as message 3 or Msg 3.

Further, in a case that the successfully decoded random access response is the one that successfully received for the first time in a series of random access procedures, the terminal apparatus 1 transmits information for identifying the terminal apparatus 1 (C-RNTI) with being included in the message 3 to be transmitted, to the base station apparatus 3.

<Message 4 (S803)>

Upon receiving the uplink transmission with the resource allocated in the random access response to the message 3 of the terminal apparatus 1, the base station apparatus 3 detects the C-RNTI MAC CE included in the received message 3. Then, in a case of establishing a connection with the terminal apparatus 1, the base station apparatus 3 transmits the PCCH addressed to the detected C-RNTI. In a case of transmitting the PCCH addressed to the detected C-RNTI, the base station apparatus 3 includes the uplink grant in the PCCH. These PCCHs transmitted from the base station apparatus 3 are referred to as message 4, Msg 4 or contention resolution message.

The terminal apparatus 1 that has transmitted the message 3 starts a contention resolution timer that defines a period for monitoring the message 4 from the base station apparatus 3, and tries to receive the downlink PCCH transmitted from the base station in the timer. The terminal apparatus 1 that has transmitted the C-RNTI MAC CE in the message 3 stops the contention resolution timer and terminates the random access procedure, assuming that the contention resolution with the other terminal apparatus 1 has succeeded, in a case that the terminal apparatus 1 receives the PCCH addressed to the transmitted C-RNTI from the base station apparatus 3 and the uplink grant for new transmission is included in the PCCH. In a case that the reception of the PCCH addressed to the C-RNTI transmitted by the terminal apparatus 1 in the message 3 could not be confirmed within the timer period, then the contention resolution is regarded as unsuccessful, and the terminal apparatus 1 transmits the random access preamble again to continue the random access procedure. Note that, in a case that the contention resolution has not succeeded after repeating the transmission of the random access preamble a predetermined number of times, it is determined that there is a problem in the random access, and the random access problem is indicated to a higher layer. For example, the higher layer may reset the MAC entity on the basis of the random access problem. In a case that a reset of the MAC entity is requested by the higher layer, the terminal apparatus 1 stops the random access procedure.

The transmission and/or reception of the above four messages allows the terminal apparatus 1 to synchronize with the base station apparatus 3 and transmit the uplink data to the base station apparatus 3.

Figure 12:
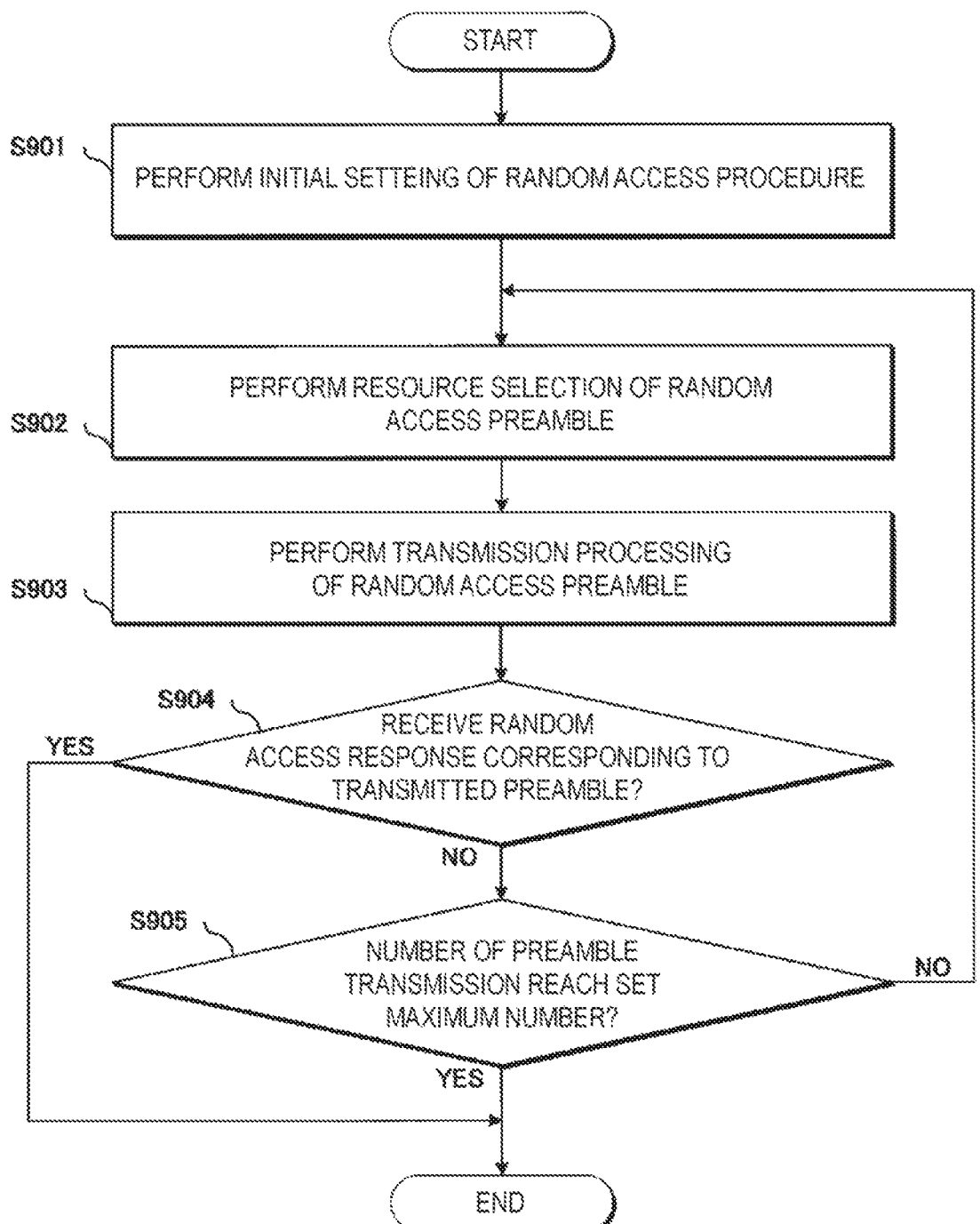
FIG. 12 is a flowchart illustrating an example of a random access procedure of the terminal apparatus 1 according to an embodiment of the present invention.

FIG. 12 is a flowchart illustrating an example of the transmission processing of the random access preamble of the terminal apparatus 1 according to the present embodiment. The terminal apparatus 1 may perform a series of transmission processing using at least one counter out of a first counter for counting the number of transmission times of the whole preamble transmission in one random access procedure, a second counter for counting the number of transmission times of preamble per one uplink precoding, and a third counter incremented each time the uplink precoding is changed.

The terminal apparatus 1 performs the initial configuration in starting the random access procedure (S901). The terminal apparatus 1 sets the counter (the first counter, the second counter and/or the third counter) to be used for the transmission processing to 1. Also, on the basis of the random access configuration information notified by the higher layer, the terminal apparatus 1 may set one or more available uplink precoding, one or more set of available PRACH resources, one or more random access preambles available in a group of random access preambles or in each group, the maximum number of transmission times of preambles in one random access procedure, the maximum number of transmission times of preambles in each uplink precoding, the transmit power of the terminal apparatus 1 in the serving cell that performs the random access procedure, the window size of the random access response, the contention resolution timer, the power ramping step, the maximum number of transmission times of the preamble transmission, the initial transmit power of preamble, and/or the power offset based on the preamble format.

The terminal apparatus 1 selects a resource of random access preamble (S902). The terminal apparatus 1 may select one uplink precoding from one or more uplink precoding available for transmission of a random access preamble on the basis of a precoding selection rule to be described below. Note that the terminal apparatus 1 may select uplink precoding in a case that a predetermined condition is satisfied. For example, the terminal apparatus 1 may perform selection processing of the uplink precoding in a case that the first counter has reached a predetermined number of times. For example, the terminal apparatus 1 may perform selection processing of the uplink precoding in a case that the second counter is 1. Also, the terminal apparatus 1 selects the PRACH resource to be used for transmission of the random access preamble from the set of available PRACH resources. Note that the PRACH resource may be set on the basis of the selected uplink precoding. Further, the terminal apparatus 1 selects a group of random access preambles to be used. Note that the terminal apparatus 1 may set a group of available random access preambles on the basis of the selected uplink precoding. On the basis of information of the selected PRACH resource, the terminal apparatus 1 determines a subframe to transmit a random access preamble. Note that the terminal apparatus 1 may determine the subframe to transmit the random access preamble from the selected uplink precoding and the selected PRACH resource. The terminal apparatus 1 randomly selects one random access preamble from the group of the selected random access preambles.

The terminal apparatus 1 performs transmission processing of the random access preamble (S903). The terminal apparatus 1 may set the transmission power of the random access preamble on the basis of the initial transmission power of the preamble set in step S901, the power offset based on the preamble format, and the power ramping step. Also, the terminal apparatus 1 may set the target received power $P_{TARGET}$ of the random access preamble on the basis of the first counter, the second counter, and/or the third counter. For example, the target received power $P_{TARGET}$ may be set as "$P_{TARGET}$=initial transmit power of preamble+ (first counter−1)*power ramping step+power offset based on preamble format". For example, the target received power $P_{TARGET}$ may be set as "$P_{TARGET}$=initial transmit power of preamble+(second counter−1)*power ramping step+power offset based on preamble format". The terminal apparatus 1 transmits a random access preamble using the selected PRACH resource, the subframe, and the target received power.

Once the random access preamble is transmitted, the terminal apparatus 1 performs a reception processing of a random access response. The terminal apparatus 1 monitors the downlink PCCH identified by the RA-RNTI within the window of the random access response. In a case that the reception of the random access response including the random access preamble identifier corresponding to the transmitted random access preamble is successful (S904—YES), the terminal apparatus 1 may stop the monitoring of the random access response and terminate the transmission of the random access preamble and the reception processing of the random access response.

In a case that the reception of the random access response fails within a random access response window or in a case that none of the received random access responses includes random access preamble identifier corresponding to the transmitted random access preamble (S904—NO), the terminal apparatus 1 performs the following processing, assuming that the reception of the random access response was not successful.

In a case that the number of transmission times of the preamble has reached the set maximum number (S905—YES), the terminal apparatus 1 terminates the transmission of the random access preambles and the reception processing of the random access responses, assuming that the random access procedure could not be successful. For example, the terminal apparatus 1 increments the first counter by 1, and in a case that the first counter has become greater than the maximum number of transmission times of the preamble transmission as information from the higher layer, the number of transmission times of the preamble is considered to have reached the set maximum number.

In a case that the number of transmissions of the preamble does not reach the set maximum number (S905—NO), the terminal apparatus 1 returns to step S902. Note that the terminal apparatus 1 may increase the second counter by 1 in the processing of S905—NO. Note that the terminal apparatus 1 may perform processing to reset the second counter and change the uplink precoding to be used for transmission of random access preamble in the subsequent step S902 only in a case that the second counter has become greater than the maximum number of transmission times per uplink precoding. Note that the terminal apparatus 1 may increase the third counter by 1 in the processing of S905—NO. Note that the terminal apparatus 1 may reset the third counter and increment the second counter by 1 only in a case that the third counter becomes greater than the number of available precoding.

Note that the RA-RNTI allocated to the PRACH, which has transmitted a random access preamble in the processing of FIG. 12, may be calculated by the following formula:

$$\text{RA-RNTI}1 + t\_id + 10 * f\_id + 64 * b\_id$$

Note that t_id is an index of the first subframe of the PRACH, f_id is an index of the subframe in a frequency direction of the PRACH, and b_id is an index of the selected uplink precoding. That is, the RA-RNTI may be determined on the basis of the uplink precoding to be used for transmission of random access preamble.

An explanation is given of a selection rule in a case that the terminal apparatus 1 according to the present embodiment receives multiple pieces of random access configuration information and selects one random access configuration information to be used for a random access procedure from multiple pieces of random access configuration information.

The terminal apparatus 1 may select random access configuration information to be used for the random access procedure on the basis of the propagation path performance between the terminal apparatus 1 and the base station apparatus 3. The terminal apparatus 1 may select random access configuration information to be used for the random access procedure on the basis of the propagation path performance measured by a downlink reference signal, which has been received from the base station apparatus 3.

The terminal apparatus 1 may randomly select one random access configuration information from multiple pieces of received random access configuration information.

The terminal apparatus 1 may select one random access configuration information from multiple pieces of received random access configuration information on the basis of a downlink signal received from the base station apparatus 3. Note that the downlink signal may be received from the base station apparatus 3 that is the transmission destination of random access preambles, or may be received from a different base station apparatus 3. For example, the random access configuration information selected on the basis of the downlink signal from the first base station apparatus 3 constituting a first cell may be used for a random access procedure with the second base station apparatus 3 constituting a second cell.

Note that, although the above selection rule is described as being applied to the selection of one random access configuration information in a case that multiple pieces of random access configuration information are received, the selection rule may be applied only to some piece of information of random access configuration information. For example, the terminal apparatus 1 according to the present embodiment may use similar rules in identifying one or more available uplink preceding by selecting one information from multiple pieces of information, in a case of receiving multiple pieces of information indicating one or more uplink preceding available for transmission of a random access preamble according to one or more pieces of random access configuration information.

Figure 13:
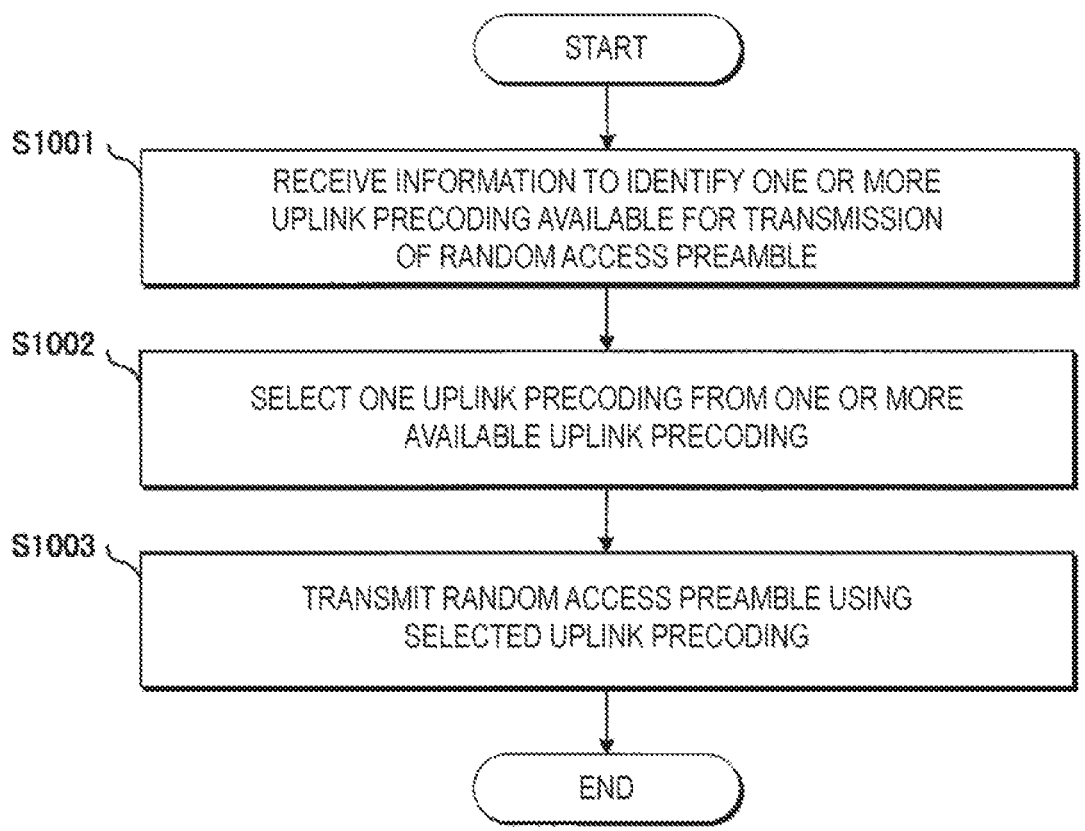
FIG. 13 is a flowchart illustrating an example of the processing related to the transmission of a random access preamble of the terminal apparatus 1 according to an embodiment of the present invention.

FIG. 13 is a flowchart illustrating the processing related to the configuration of the uplink precoding of the terminal apparatus 1 according to the present embodiment.

In step S1001 of FIG. 13, the terminal apparatus 1 receives information to identify one or more precoding available for transmission of a random access preamble. Note that information to identify one or more precoding available for transmission of the random access preamble may be information included in the random access configuration information.

Note that information to identify one or more precoding available for transmission of the random access preamble may be information indicating an index of one or more available uplink precoding. Note that, in addition to information identifying one or more precoding available for transmission of the random access preamble, the terminal apparatus 1 may receive information related to the PRACH resources corresponding to each of the one or more available precoding. Note that information related to the PRACH resource may include information on time resources and/or frequency resources available in transmitting the random access preamble using the corresponding precoding. Note that the available time resource information may be information indicating an available symbol number, subframe number, and/or radio frame number. Note that the available frequency resource information may be information indicating available sub-carriers and/or resource blocks.

In step S1002 of FIG. 13, the terminal apparatus 1 selects one uplink precoding from one or more available uplink precoding. The selection rule of the uplink precoding applied to the transmission of the random access preamble according to the present embodiment will be described.

The terminal apparatus 1 according to the present embodiment may randomly select one uplink precoding from one or more available uplink precoding. For example, the terminal apparatus 1 may randomly selects one from $I_{p1}$, $I_{p2}$, and $I_{p3}$ in a case that $I_{p2}$ and $I_{p3}$ are available uplink precoding indexes according to received random access configuration information, and may use uplink precoding corresponding to the index for transmission of the random access preamble.

In a case of changing the uplink precoding without being able to receive the random access response by the uplink precoding used in this case, selection can be randomly made from the indexes not used among $I_{p1}$, $I_{p2}$ and $I_{p3}$ or can be randomly made from $I_{p1}$, $I_{p2}$, and $I_{p3}$. Note that any one of one or more available uplink precoding may be associated with one or more available random access preambles. In this case, the uplink precoding associated with the selected random access preamble is selected by selecting one random access preamble from one or more random access preambles. That is, one random access preamble is associated with one preamble sequence and one uplink precoding among available uplink precoding. Note that the preamble sequence may be a sequence identified by one root sequence and one cyclic shift. For example, in a case that uplink precoding with indexes of 0 and 1 are available and 64 preamble sequences per index of one uplink precoding are available, the preambles with the index of 0 to 63 are set as the random access preambles using the uplink precoding with index of 0, and the preambles with the index of 64 to 127 are set as the random access preambles using the uplink precoding with index of 1, and then the terminal apparatus 1 may randomly select and use one out of the random access preambles having the preambles with the index of 0 to 127.

The terminal apparatus 1 according to the present embodiment may select one uplink precoding from one or more available uplink precoding on the basis of a predetermined rule. For example, in a case that uplink precoding with indexes of $I_{p1}$, $I_{p2}$ and $I_{p3}$ is available according to received random access configuration information, the terminal apparatus 1 may select the one with the smallest index value and use the selected uplink precoding for transmission of the random access preamble. In a case of changing the uplink precoding by the failure of receiving the random access response corresponding to the transmitted random access preamble in this case, the smallest index value may be selected out of unused indexes among $I_{p1}$, $I_{p2}$, and $I_{p3}$. Note that the index of the uplink precoding to be selected may be associated with the third counter. For example, an uplink precoding to be selected for each value of the third counter may be determined.

In a case that the uplink precoding with the indexes of $I_{p1}$, $I_{p2}$ and $I_{p3}$ are available according to received random access configuration information, the terminal apparatus 1 according to the present embodiment may use the uplink precoding capable of transmitting a random access preamble in the earliest subframe among the PRACH resources allocated to each uplink precoding. In a case of changing the uplink precoding by the failure of receiving the random access response corresponding to the transmitted random access preamble in this case, an index capable of transmitting the random access preamble may be selected out of unused uplink precoding indexes among $I_{p1}$, $I_{p2}$, and $I_{p3}$.

In a case that the uplink precoding with the indexes of $I_{p1}(i)$, $I_{p2}(i)$ and $I_{p3}(i)$ are available in the PRACH resource i according to received random access configuration information, the terminal apparatus 1 according to the present embodiment may transmit a random access preamble using an uplink precoding randomly selected from the uplink precoding of the PRACH resource i capable of transmitting a random access preamble in the earliest subframe out of the plurality of PRACH resources i. In a case that the reception of the random access response corresponding to the transmitted random access preamble failed, one can use an uplink precoding randomly selected from the uplink precoding of the PRACH resource i capable of transmitting a random access preamble in the earliest subframe out of the plurality of PRACH resources i.

The terminal apparatus 1 according to the present embodiment may select uplink precoding to be used for transmission of a random access preamble on the basis of downlink precoding used for reception of a downlink signal from the base station apparatus 3. For example, in a case that uplink precoding with indexes of $I_{p1}$, $I_{p2}$ and $I_{p3}$ are available according to received random access configuration information, the terminal apparatus 1 may select the uplink precoding (for example, having the best transmission performance determined by the downlink signal) associated with the downlink precoding used for receiving the downlink signal (or downlink precoding determined to be the best by measurement of the downlink signal) for transmission of the random access preamble. In a case of changing the uplink precoding by the failure of receiving the random access response corresponding to the transmitted random access preamble in this case, an index estimated that the transmission performance will be the best may be selected out of the indexes of the unused uplink precoding among $I_{p1}$, $I_{p2}$ and $I_{p3}$.

In step S1003 of FIG. 13, the terminal apparatus 1 transmits a random access preamble using an uplink precoding selected in step S1002.

Figure 14:
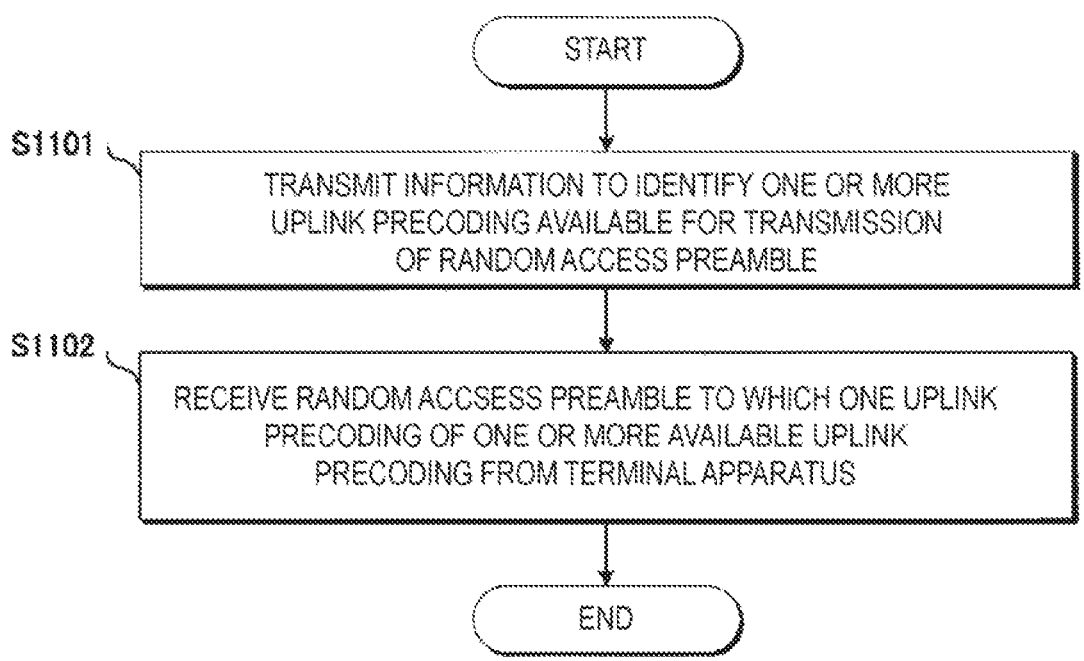
FIG. 14 is a flowchart illustrating an example of the processing related to the reception of a random access preamble of the base station apparatus 3 according to an embodiment of the present invention.

FIG. 14 is a flowchart illustrating the processing related to the reception of the random access preamble of the base station apparatus 3 according to the present embodiment.

In step S1101 of FIG. 14, the base station apparatus 3 transmits information for identifying one or more uplink precoding that the terminal apparatus 1 can use for transmission of a random access preamble. Information to identify one or more precoding available for transmission of random access preamble by the terminal apparatus 1 may be transmitted as some piece of random access configuration information to be transmitted from the base station apparatus 3 to the terminal apparatus 1. Note that, in addition to information to identify one or more uplink precoding available for terminal apparatus 1 to transmit a random access preamble, the base station apparatus 3 may transmit information related to the PRACH resources corresponding to each of the one or more available uplink precoding. Note that information related to the PRACH resource may include information on time resources and/or frequency resources available in transmitting a random access preamble using a corresponding uplink precoding. Note that available time resource information may be information indicating an available symbol number, subframe number, and/or radio frame number. Note that available frequency resource information may be information indicating available sub-carriers and/or resource blocks.

In step S1102 of FIG. 14, the base station apparatus 3 receives from the terminal apparatus 1 a random access preamble with one uplink precoding being applied from one or more uplink precoding indicated by information that has been transmitted in step S1101 to identify one or more uplink precoding available for transmission of random access preamble. Note that the base station apparatus 3 may receive a random access preamble only with the time resource and/or the frequency resource indicated by information related to the PRACH resource that has been transmitted to the terminal apparatus 1. Note that the base station apparatus 3 may identify the uplink precoding used for transmission of the random access preamble on the basis of the time resource and/or frequency resource that received the random access preamble.

An explanation is given to an example of the retransmission processing of the random access preamble in a case that the terminal apparatus 1 according to the present embodiment did not detect the random access response corresponding to the random access preamble transmitted by the terminal apparatus 1 using one uplink precoding.

Figure 15:
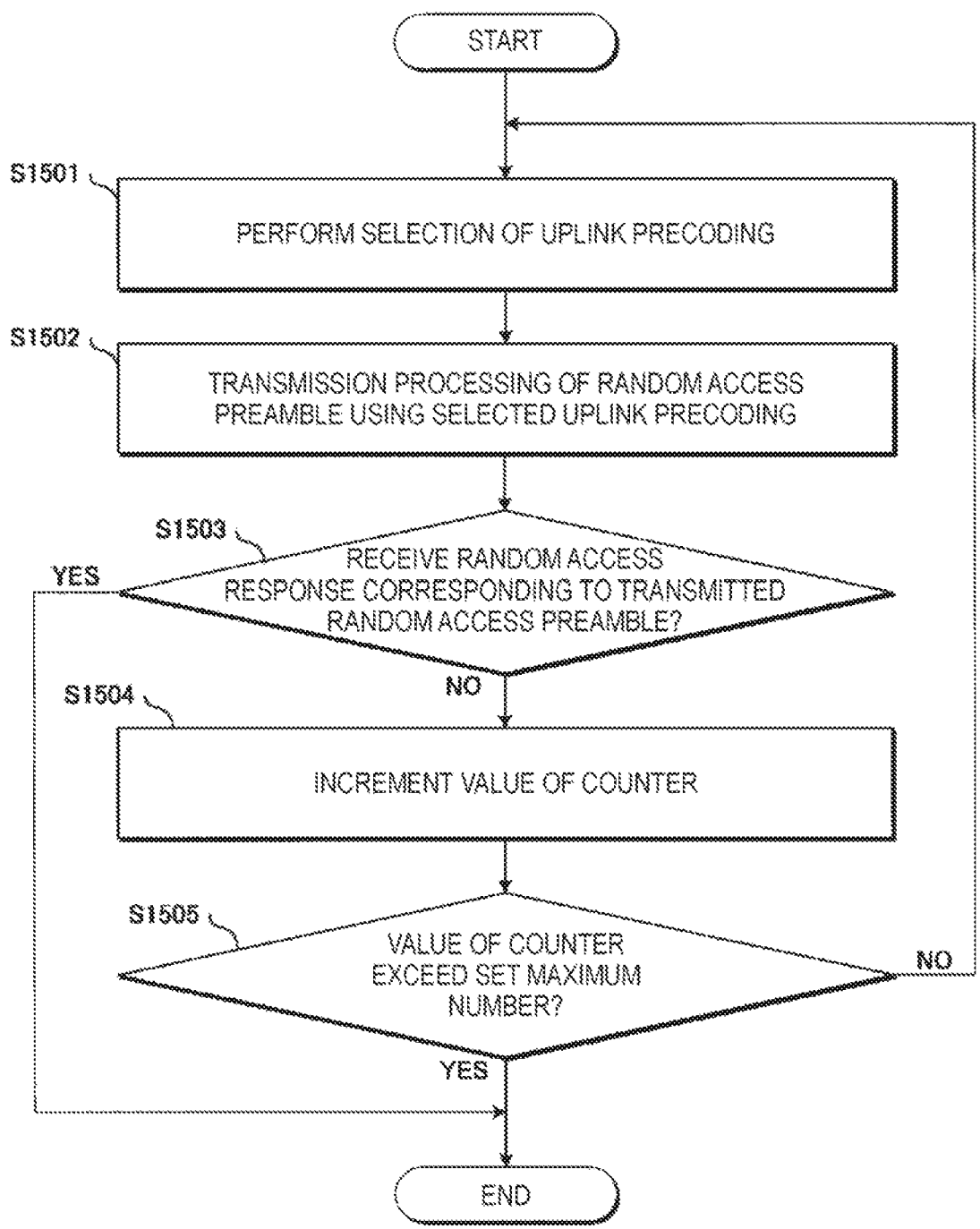
FIG. 15 is a flowchart illustrating an example of the processing related to retransmission of a random access preamble of the terminal apparatus 1 according to an embodiment of the present invention.

FIG. 15 is a flowchart illustrating an example of the retransmission processing of the random access preamble in the terminal apparatus 1 according to the present embodiment. The terminal apparatus 1 selects one uplink precoding from one or more available uplink precoding (S1501), and transmits a random access preamble using selected one uplink precoding to the base station apparatus 3 (S1502). The terminal apparatus 1 monitors a random access response with respect to the transmitted one random access preamble, and terminates the transmission processing of the random access preamble in a case that the reception of the random access response is successful (S1503—YES), and increments the value of the counter (S1504) in a case that the reception of the random access response is not successful (S1503—NO). In incrementing the value of the counter, the terminal apparatus 1 terminates the transmission processing of the random access preamble if the value of the counter exceeds a predetermined value (S1505—YES), and returns to step S1501 to retransmit a random access preamble if the value of the counter does not exceed a predetermined value (S1505—NO).

As an example of the retransmission processing of the random access preamble, the terminal apparatus 1 increments a first counter in a case that the random access response corresponding to the transmitted random access preamble is not detected in a period of a set random access response window. In a case that the value of the incremented first counter does not exceed the maximum number of transmission times of the random access preamble set according to random access configuration information, the terminal apparatus 1 performs a retransmission processing of random access preamble. Note that the terminal apparatus 1 may change the uplink precoding to be used for transmission of random access preamble each time the first counter is incremented. Note that the terminal apparatus 1 may increase the value of the target received power $P_{TARGET}$ to be used for transmission of the random access preamble every time the first counter is incremented by a predetermined number of times. Note that the terminal apparatus 1 may increase the value of the target received power $P_{TARGET}$ in a case that the random access preamble has transmitted using all of one or more uplink precoding available for transmission of the random access preamble. Note that the target received power $P_{TARGET}$ may be set as "$P_{TARGET}$=initial transmit power of random access preamble+Floor((first counter−1)/number of available uplink preceding)*power ramping step+power offset based on preamble format". Note that Floor(X) represents the floor function of X.

As another example of the retransmission processing of the random access preamble, the terminal apparatus 1 increments a third counter in a case that the random access response corresponding to the transmitted random access preamble is not detected in a period of a set random access response window. In a case that the value of the incremented third counter does not exceed a number of the uplink preceding available for transmission of random access preamble, the terminal apparatus 1 changes the uplink preceding to be used for transmission of random access preamble to perform a retransmission processing of random access preamble. In a case that the value of the incremented third counter exceeds a number of the uplink preceding available for transmission of random access preamble, the terminal apparatus 1 increments the second counter and resets the third counter. In a case that the value of the incremented second counter does not exceed a maximum number of transmission times of the random access preamble per uplink preceding, the terminal apparatus 1 performs a retransmission processing of the random access preamble by changing the uplink preceding to be used for transmission of the random access preamble. Note that the terminal apparatus 1 may increase the value of the target received power $P_{TARGET}$ to be used for transmission of the random access preamble every time the second counter is incremented. Note that the target received power $P_{TARGET}$ may be set as "$P_{TARGET}$=initial transmit power of random access preamble+(second counter−1)*power ramping step+power offset based on preamble format".

As another example of the retransmission processing of the random access preamble, the terminal apparatus 1 increments a second counter in a case that the random access response corresponding to the transmitted random access preamble is not detected in a period of a set random access response window. In a case that the value of the incremented second counter does not exceed a maximum number of transmission times of the random access preamble per uplink preceding, the terminal apparatus 1 performs a retransmission processing of the random access preamble without changing the uplink preceding to be used for transmission of the random access preamble. In a case that the value of the incremented second counter exceeds the maximum number of transmission times of the random access preamble per uplink precoding, the terminal apparatus 1 resets the second counter, and changes the uplink precoding to be used for transmission of random access preamble and performs a retransmission processing of random access preamble. Note that the terminal apparatus 1 may increase the value of the target received power $P_{TARGET}$ to be used for transmission of the random access preamble every time the second counter is incremented. Note that the target received power $P_{TARGET}$ may be set as "$P_{TARGET}$=initial transmit power of random access preamble+(second counter−1)*power ramping step+power offset based on preamble format".

Note that the terminal apparatus 1 according to the present embodiment may transmit a plurality of random access preambles using a plurality of uplink precoding among one or more uplink precoding available in transmitting a random access preamble. For example, in a case that a first uplink precoding and a second uplink precoding are available, the terminal apparatus 1 may transmits a first random access preamble using the first precoding and a second random access preamble using the second precoding. Note that, in a case that the time resource corresponding to the first uplink precoding is a first time resource and the time resource of the random access preamble corresponding to the second uplink precoding is a second time resource, the terminal apparatus 1 may transmit a first random access preamble with the first time resource and a second random access preamble with the second time resource.

The terminal apparatus 1 that transmitted the plurality of random access preambles monitors a random access response corresponding to each of the plurality of transmitted random access preambles. In a case that none of the random access responses corresponding to each of the plurality of random access preambles transmitted in a period of the set random access response window can be detected, the terminal apparatus 1 increments the second counter. In a case that the value of the incremented second counter does not exceed the maximum number of transmission times of the random access preamble per uplink precoding, the terminal apparatus 1 performs a retransmission processing of the random access preamble. Note that the terminal apparatus 1 may increase the value of the target received power $P_{TARGET}$ to be used for transmission of the random access preamble every time the second counter is incremented. Note that the target received power $P_{TARGET}$ may be set as "$P_{TARGET}$=initial transmit power of random access preamble+(second counter−1)*power ramping step+power offset based on preamble format".

Configurations of apparatuses according to the present embodiment will be described below.

Figure 16:
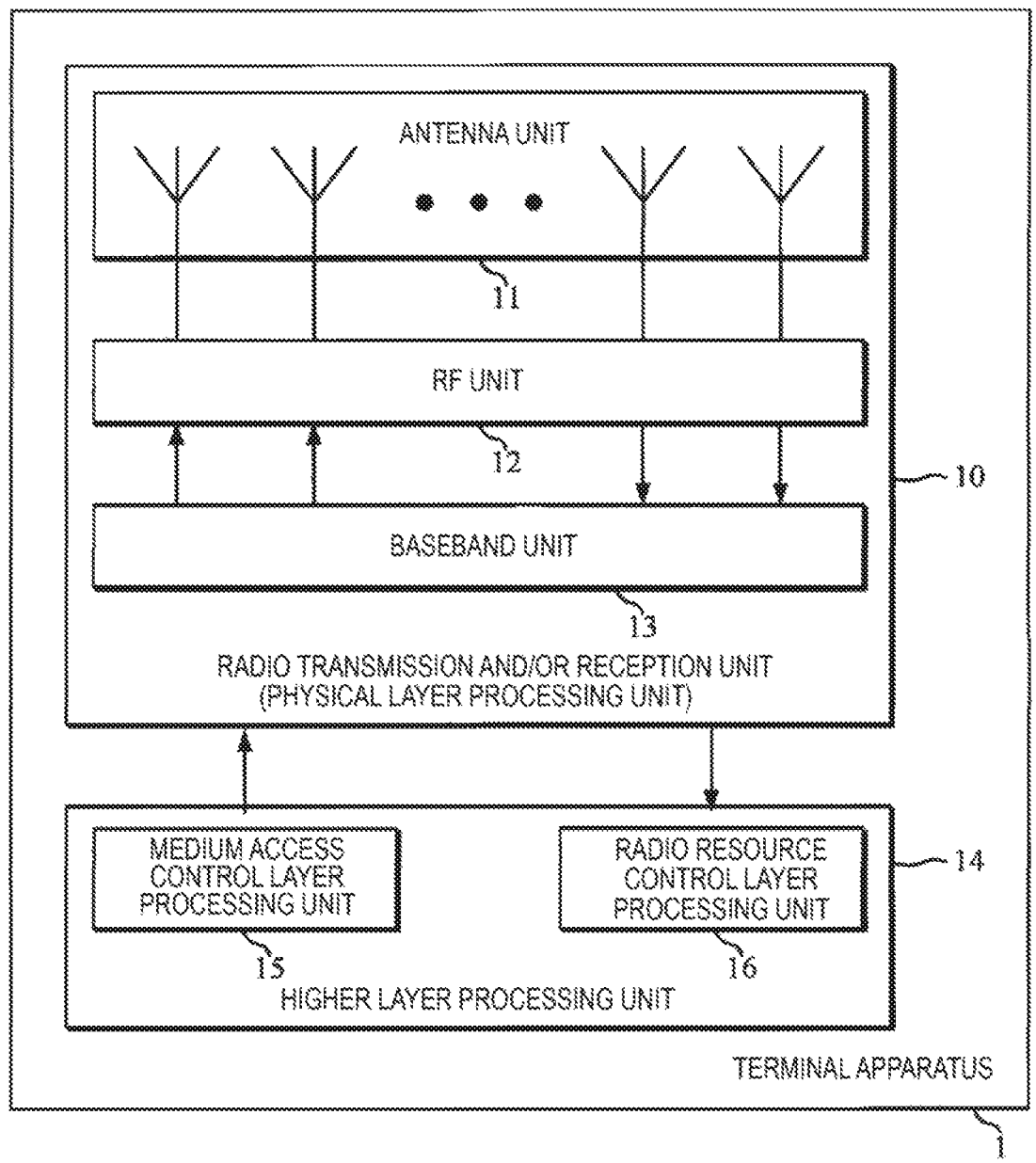
FIG. 16 is a schematic block diagram illustrating a configuration of the terminal apparatus 1 according to an embodiment of the present invention.

FIG. 16 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RE) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit. The higher layer processing unit 14 is also referred to as a selection unit and a counter unit.

The higher layer processing unit 14 outputs uplink data (transport block) generated by a user operation or the like, to the radio transmission and/or reception unit 10. The higher layer processing unit 14 performs the processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control unit 16 sets the various configuration information/parameters in accordance with the information indicating the various configuration information/parameters received from the base station apparatus 3. Higher layer processing unit 14 may have a function for selecting the uplink precoding to be used for transmission of the random access preamble on the basis of information to identify a plurality of uplink precoding available for transmission of the random access preamble received from the base station apparatus 3. The higher layer processing unit 14 may have a function for selecting one random access configuration information to be used in the random access procedure from multiple pieces of random access configuration information received from the base station apparatus 3. The higher layer processing unit 14 may have a function for incrementing the first counter, the second counter, and/or the third counter.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission/reception unit 10 receives random access configuration information. The radio transmission/reception unit 10 may have a function for receiving multiple pieces of random access configuration information. The radio transmission and/or reception unit 10 generates a transmit signal by modulating and coding data, and performs transmission to the base station apparatus 3. The radio transmission/reception unit 10 may have a function for transmitting a random access preamble to the base station apparatus 3 using the uplink precoding selected by the higher layer processing unit 14. The radio transmission/reception unit 10 may have a function for transmitting a random access preamble to the base station apparatus 3 on the basis of random access configuration information selected by the higher layer processing unit 14.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 performs Inverse Fast Fourier Transform (IFFT) of the data to generate a SC-FDMA symbol, attaches CP to the generated SC-FDMA symbol to generate a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 17:
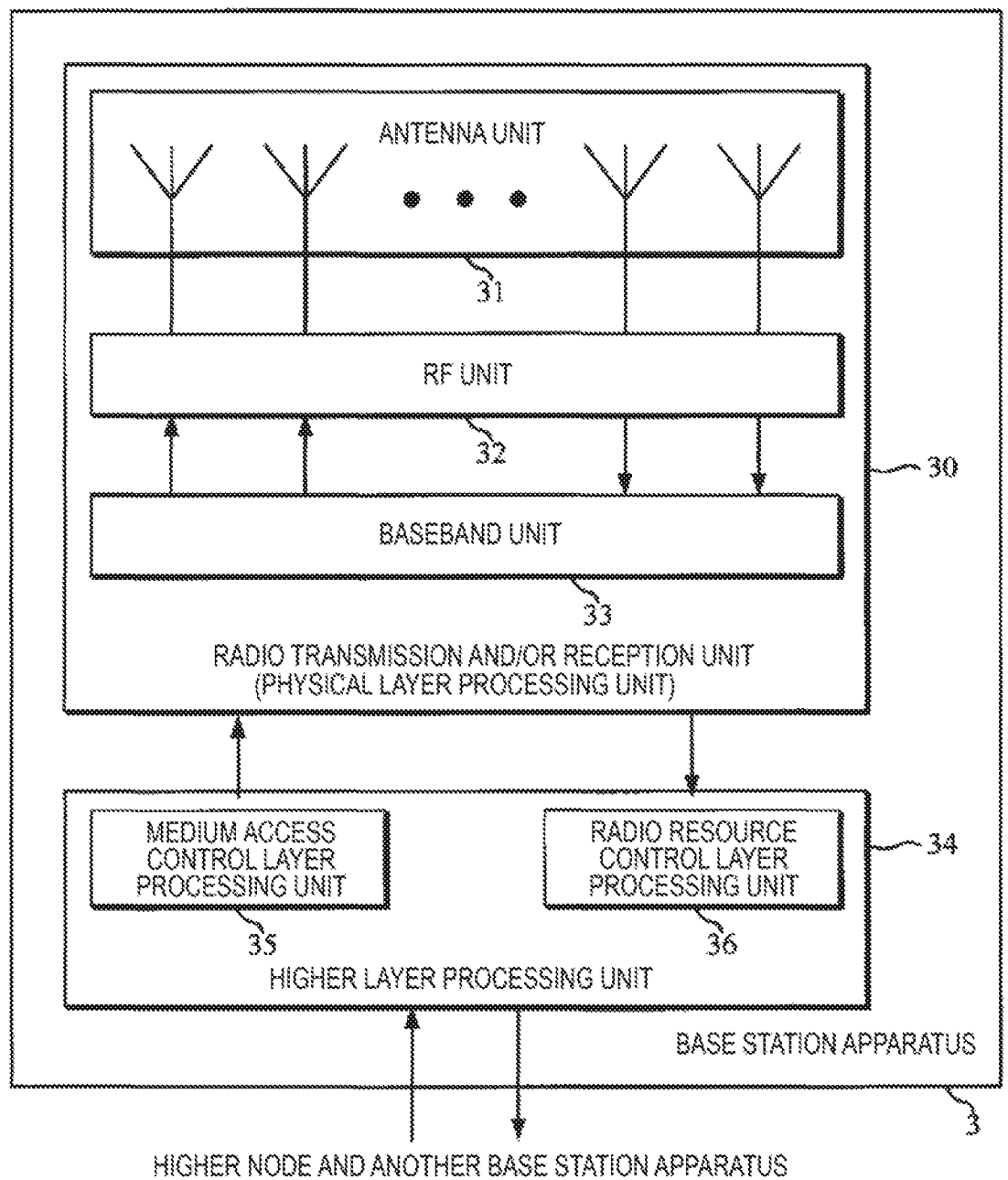
FIG. 17 is a schematic block diagram illustrating a configuration of the base station apparatus 3 according to an embodiment of the present invention.

FIG. 17 is a schematic block diagram illustrating a configuration of the base station apparatus 3 in the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs the processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, a RRC message, a MAC Control Element (CE), and the like, and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters. Namely, the radio resource control layer processing unit 36 transmits/broadcasts random access configuration information to each of the terminal apparatuses 1.

The functionality of the radio transmission and/or reception unit 30 is similar to the functionality of the radio transmission and/or reception unit 10, and hence description thereof is omitted. Note that the radio transmission/reception unit 30 may have a function for transmitting random access configuration information.

Note that the radio transmission/reception unit 30 may have a function for transmitting information to specify a plurality of uplink precoding available for transmission of a random access preamble. Note that the radio transmission/reception unit 30 may have a function for receiving a random access preamble.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to an aspect of the present invention will be described below.

(1) The first aspect of the present invention is a terminal apparatus 1 comprising a reception unit 10 to receive information identifying one or more precoding (also referred to as uplink precoding or beam) available for transmission of a random access preamble, a selection unit 14 to select one preceding from the one or more precoding, and a transmitting unit 10 to transmit the random access preamble using the selected one precoding.

(2) In the first aspect of the present invention, the reception unit 10 receives information related to PRACH resource corresponding to each of the one or more preceding, the selection unit 14 selects one PRACH resource corresponding to the selected one preceding from the PRACH resources corresponding to each of the one or more preceding, and the transmission unit 10 transmits the random access preamble using the selected one PRACH resource.

(3) In the first aspect of the present invention, the reception unit 10 receives information related to one PRACH resource, and the time resource used for transmission of the random access preamble is determined on the basis of the selected one precoding and the one PRACH resource.

(4) In the first aspect of the present invention, the selection unit 14 randomly selects the one precoding from the one or more precoding.

(5) In the first aspect of the present invention, the selection unit 14 selects the one precoding from the one or more precoding according to a predetermined rule.

(6) In the first aspect of the present invention, the selection unit 14 selects the one precoding from the one or more precoding on the basis of the received power of the signal received from the base station apparatus 3.

(7) The second aspect of the present invention is a terminal apparatus 1, comprising a reception unit 10 to receive information identifying one or more random access preambles available for transmission of a random access preamble, a selection unit 14 to select one random access preamble from the one or more available random access preambles, and a transmission unit 10 to transmit the selected random access preamble using the one preamble sequence associated with the selected random access preamble and the one precoding, each of the one or more random access preambles is associated with one preamble sequence and one precoding (also referred to as uplink precoding or beam).

(8) in the second aspect of the present invention, the one preamble sequence is identified by one root sequence and one cyclic shift.

(9) The third aspect of the present invention is terminal apparatus 1, comprising a reception unit 10 to receive information related to a plurality of groups and receive information for identifying one or more available random access preambles included in each of the plurality of groups (also referred to as a preamble group), a selection unit 14 to select one group from the plurality of groups and select one random access preamble out of one or more available random access preambles included in the selected one group, each of the plurality of groups being associated with one precoding out of the available one or more precoding (also referred to as uplink precoding or beam), and a transmission unit 10 to transmit the selected one random access preamble using the one precoding associated with the selected one group.

(10) The fourth aspect of the present invention is a base station apparatus 3 comprising a transmission unit 30 to transmit information for identifying one or more precoding (also referred to as uplink precoding or beam) available for transmission of a random access preamble by a terminal apparatus 1, a reception unit 30 to receive the random access preamble transmitted using one precoding of the one or more available precoding.

(11) In the fourth aspect of the present invention, the transmission unit 30 transmits information related to PRACH resource corresponding to each of the one or more precoding, and the reception unit 30 receives the random access preamble transmitted using the one precoding in the PRACH resource corresponding to the one precoding among the PRACH resources corresponding to each of the one or more precoding.

(12) In the fourth aspect of the present invention, the transmission unit 30 transmits information related to one PRACH resource, and the reception unit 30 receives the random access preamble with a time resource to be determined on the basis of the one precoding and the one PRACH resource.

(13) The fifth aspect of the present invention is a base station apparatus 3, comprising a transmission unit 30 to transmit information for identifying one or more random access preambles available for transmission of a random access preamble by the terminal apparatus 1, and a reception unit 30 to receive the transmitted one random access preamble using the one preamble sequence associated with the one random access preamble out of the one or more random access preambles and the one precoding, each of the one or more random access preambles is associated with one preamble sequence and one precoding (also referred to as uplink precoding or beam).

(14) In the fifth aspect of the present invention, the one preamble sequence is identified by one root sequence and one cyclic shift.

(15) The sixth aspect of the present invention is a base station apparatus 3, comprising a transmission unit 30 to transmit information related to a plurality of groups and transmit information for identifying one or more available random access preambles included in each of the plurality of groups by a terminal apparatus 1, and a reception unit 30 to receive one random access preamble out of the available one or more random access preambles included in the one group transmitted using the one precoding associated with one group of the plurality of groups, each of the plurality of groups being associated with one precoding out of the available one or more precoding (also referred to as uplink precoding or beam).

(16) According to a seventh aspect of the present invention is a terminal apparatus 1, comprising a selection unit 14 to select a first precoding from a plurality of available precoding (also referred to as uplink precoding or beam) and select a first random access preamble from a plurality of available random access preambles; a transmission unit 10 to transmit the first random access preamble to a base station apparatus using the first precoding; a reception unit 10 to monitor a random access response corresponding to the first random access preamble; and a counter unit 14 to increment a value of a counter in a case that a reception of the random access response is not successful, wherein the selection unit 14 selects a second precoding from the plurality of available precoding and selects a second random access preamble from the plurality of available random access preambles, if the value of the counter does not reach a predetermined value in a case that the value of the counter is incremented, wherein the transmission unit 10 transmits the second random access preamble using the second precoding to the base station apparatus 3.

(17) In the seventh aspect of the present invention, there is provided a power control unit 12 to set a first power that is a target received power in a case of transmitting the first random access preamble and a second power that is a target received power in a case of transmitting the second random access preamble, wherein the first power and the second power are set on the basis of a value of the counter.

(18) In the seventh aspect of the present invention, in a case that the value of the incremented counter is a predetermined value, the second power is set to a value greater than the first power.

(19) The eighth aspect of the present invention is a terminal apparatus 1 comprising: a transmission unit 10 to transmit a plurality of random access preambles, to Which a plurality of precoding different from each other (also referred to as uplink precoding or beam) are applied, to a base station apparatus 3; a reception unit 10 to monitor random access responses corresponding to the plurality of transmitted random access preambles; and a counter unit 14 to increment a value of a counter in a case that a reception of the random access response is not successful, wherein the transmission unit 10 transmits again the plurality of random access preambles, to which the plurality of precoding are applied, to a base station apparatus 3, if the value of the counter does not reach a predetermined value in a case that the value of the counter is incremented by 1.

(20) In the eighth aspect of the present invention, a power control unit 12 to set a target received power in a case of transmitting the plurality of random access preambles is included, wherein the target received power is increased each time a value of the counter is incremented.

(21) The ninth aspect of the present invention is a base station apparatus 3 comprising: a transmission unit 30 to transmit information for identifying one or a plurality of precoding (also referred to as uplink precoding or beam) available to a terminal apparatus 1; and a reception unit 30 to receive a random access preamble transmitted from the terminal apparatus 1 using one precoding of the one or the plurality of precoding, wherein the transmission unit 30 transmits a random access response corresponding to the received random access preamble and the one precoding.

(22) The 10th aspect of the present invention is a terminal apparatus 1 comprising a reception unit 10 to receive multiple pieces of random access configuration information, a selection unit 14 to select one random access configuration information to be used in the random access procedure out of multiple pieces of random access configuration information, and a transmission unit 10 to transmit a random access preamble on the basis of the selected one random access configuration information.

(23) In the 10th aspect of the present invention, the transmission unit 10 transmits the random access preamble using one precoding of the available one or more precoding, in a case that the one or more precoding (also referred to as uplink preceding or beam) available for transmitting the random access preamble is included in the selected one random access configuration information.

(24) In the 10th aspect of the present invention, the one random access configuration information is selected on the basis of a propagation path performance between the base station apparatus 3 and the terminal apparatus 1.

(25) In the 10th aspect of the present invention, the one random access configuration information is randomly selected.

(26) In the 10th aspect of the present invention, multiple pieces of random access configuration information is received with a downlink carrier different from the downlink carrier corresponding to the uplink carrier used for transmitting the random access preamble.

(27) The 11th aspect of the present invention is a base station apparatus 3 comprising a transmission unit 30 to transmit multiple pieces of random access configuration information to the terminal apparatus 1, and a reception unit 30 to receive a random access preamble transmitted from the terminal apparatus on the basis of one random access configuration information of among multiple pieces of random access configuration information.

(28) In the 11th aspect of the present invention, the reception unit 30 receives the transmitted random access preamble using one precoding of the available one or more precoding from the terminal apparatus 1, in a case that the one or more precoding (also referred to as uplink precoding or beam) available for transmitting the random access preamble is included in the one random access configuration information.

(29) In the 11th aspect of the present invention, the one random access configuration information is selected on the basis of a propagation path performance between the base station apparatus 3 and the terminal apparatus 1.

(30) In the 11th aspect of the present invention, the one random access configuration information is randomly selected by the terminal apparatus 1.

(31) In the 11th aspect of the present invention, multiple pieces of random access configuration information is transmitted with a downlink carrier different from the downlink carrier corresponding to the uplink carrier used for transmitting the random access preamble.

A program running on an apparatus according to an aspect of the present invention may serve as a program that controls a Central Processing Unit (CPU) and the like to cause a computer to operate in such a manner as to realize the functions of the embodiment according to an aspect of the present invention. Programs or information handled by the programs are temporarily stored in a volatile memory such as a Random Access Memory (RAM), or a non-volatile memory such as a flash memory, a Hard Disk Drive (HDD), or another storage system.

A program for realizing the functions of the embodiment according to one aspect of the present invention may be recorded in a computer readable recording medium. Also, it may be realized by causing a computer system to read a program recorded on this recording medium for execution. It is assumed that the "computer system" refers to a computer system built into the apparatuses, and the computer system includes an operating system and hardware components such as a peripheral device. Further, the "computer-readable recording medium" may be a semiconductor recording medium, an optical recording medium, a magnetic recording medium, a medium that holds a program dynamically for a short period of time, or another recording medium that can be read by a computer.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or a processor of known type, a controller, a microcontroller, or a state machine. The above-mentioned circuits may be constituted of a digital circuit, or may be constituted of an analog circuit. Furthermore, in a case that with advances in semiconductor technology, a circuit integration technology appears that replaces the present integrated circuits, it is also possible to use new integrated circuit based on the technology in one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, in an aspect of the present invention, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized in, for example, a communication system, a communication apparatus (for example, a mobile phone apparatus, a base station apparatus, a wireless LAN apparatus, or a sensor device), an integrated circuit (for example, a communication chip), or program.

REFERENCE SIGNS LIST 1 (1A, 1B) Terminal apparatus
3 Base station apparatus
4 Transmission and/or Reception Point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
transmission circuitry configured to transmit a random access preamble to a base station apparatus;
reception circuitry configured to monitor a random access response corresponding to the random access preamble; and
higher layer operation circuitry configured to increment a first counter in a case that the random access response is not received within a duration of a random access response window and increment a second counter which is different with the first counter, the first counter being for a retransmission of the random access preamble, and the second counter being for calculating a power of the random access preamble, wherein the higher layer operation circuitry is configured to
determine whether or not a first value of the first counter exceeds a maximum number of transmission of the random access preamble, increment the second counter in a case that the random access response is not received within the duration of the random access response window and a condition on an uplink transmission beam is satisfied at a time of retransmission of the random access preamble, and set a target reception power $P_{TARGET}$ for the random access preamble, the target reception power $P_{TARGET}$ including a power of preamble, a power based on a second value of the second counter and a power offset based on preamble format, the power based on the second value of the second counter is indicated by (the second value of the second counter−1) *power ramping step, the power of preamble, the power offset based on preamble format and the power ramping step being based on a higher layer signaling.

2. A communication method used for a terminal apparatus, the communication method comprising:

transmitting a random access preamble to a base station apparatus;

monitoring a random access response corresponding to the random access preamble;

incrementing a first counter in a case that the random access response is not received within a duration of a random access response window, and incrementing a second counter which is different with the first counter, the first counter being for a retransmission of the random access preamble, and the second counter being for calculating a power of the random access preamble;

determining whether or not a first value of the first counter exceeds a maximum number of transmission of the random access preamble;

incrementing the second counter in a case that the random access response is not received within the duration of the random access response window and a condition on an uplink transmission beam is satisfied at a time of retransmission of the random access preamble; and setting a target reception power $P_{TARGET}$ for the random access preamble, the target reception power $P_{TARGET}$ including a power of preamble, a power based on a second value of the second counter and a power offset based on preamble format, the power based on the second value of the second counter is indicated by (the second value of the second counter−1)*power ramping step, the power of preamble, the power offset based on preamble format and the power ramping step being based on a higher layer signaling.

3. A base station apparatus comprising:
reception circuitry configured to receive a random access preamble from a terminal apparatus; and transmission circuitry configured to transmit a random access response corresponding to the random access preamble, wherein:

a first counter is incremented in a case that the random access response is not received within a duration of a random access response window;

a second counter which is different with the first counter is incremented in a case that the random access response is not received within the duration of the random access response window and a condition on an uplink transmission beam is satisfied at a time of retransmission of the random access preamble;

the first counter is for a retransmission of the random access preamble, the second counter is for calculating a power of the random access preamble;

a first value of the first counter is used to determine whether or not a maximum number of transmission of the random access preamble is exceeded; and a second value of the second counter is used to set a target reception power $P_{TARGET}$ for the random access preamble, the target reception power $P_{TARGET}$ including a power of preamble, a power based on the second value of the second counter and a power offset based on preamble format, the power based on the second value of the second counter is indicated by (the second value of the second counter−1)*power ramping step, the power of preamble, the power offset based on preamble format and the power ramping step being based on a higher layer signaling.

4. A communication method used for a base station apparatus, the communication method comprising:

receiving a random access preamble from a terminal apparatus; and transmitting a random access response corresponding to the random access preamble, wherein:

a first counter is incremented in a case that the random access response is not received within a duration of a random access response window;

a second counter which is different with the first counter is incremented in a case that the random access response is not received within the duration of the random access response window and a condition on an uplink transmission beam is satisfied at a time of retransmission of the random access preamble;

the first counter is for a retransmission of the random access preamble, the second counter is for calculating a power of the random access preamble;

a first value of the first counter is used to determine whether or not a maximum number of transmission of the random access preamble is exceeded; and a second value of the second counter is used to set a target reception power $P_{TARGET}$ for the random access preamble, the target reception power $P_{TARGET}$ including a power of preamble, a power based on the second value of the second counter and a power offset based on preamble format, the power based on the second value of the second counter is indicated by (the second value of the second counter−1)*power ramping step, the power of preamble, the power offset based on preamble format and the power ramping step being based on a higher layer signaling.

* * * * *